United States Patent
Cariou et al.

(10) Patent No.: US 11,812,385 B2
(45) Date of Patent: Nov. 7, 2023

(54) MULTI-LINK DEVICE CONFIGURED FOR INITIAL POWER MANAGEMENT MODES AFTER MULTI-BAND LINK ENABLEMENT

(71) Applicant: Intel Corporation, Santa Clara, CA (US)

(72) Inventors: Laurent Cariou, Portland, OR (US); Yaron Alpert, Hod Hasharoni (IL); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 17/196,527

(22) Filed: Mar. 9, 2021

(65) Prior Publication Data

US 2021/0337475 A1  Oct. 28, 2021

Related U.S. Application Data

(63) Continuation of application No. 16/792,746, filed on Feb. 17, 2020, now Pat. No. 10,972,980, which is a
(Continued)

(51) Int. Cl.
*H04W 52/02* (2009.01)
*H04W 52/16* (2009.01)
(Continued)

(52) U.S. Cl.
CPC ......... *H04W 52/0235* (2013.01); *H04L 5/001* (2013.01); *H04L 5/0098* (2013.01);
(Continued)

(58) Field of Classification Search
CPC ......... H04W 52/0235; H04W 52/0229; H04W 52/16; H04W 52/34; H04W 52/04; H04L 5/001; H04L 5/0098; Y02D 30/70
See application file for complete search history.

(56) References Cited

U.S. PATENT DOCUMENTS 9,485,728 B1   11/2016  Banerjea et al.
10,609,647 B2   3/2020  Cariou et al.
(Continued)

OTHER PUBLICATIONS

U.S. Appl. No. 15/638,550 U.S. Pat. No. 10,609,647, filed Jun. 30, 2017, Multi-Band Link-Aggregation Pre-Negotiated Power Save Modes.
(Continued)

*Primary Examiner* — Steven Hieu D Nguyen
(74) *Attorney, Agent, or Firm* — Schwegman Lundberg & Woessner, P.A.

(57) ABSTRACT

An apparatus for implementing power control for a radio device that has multiple radio transceivers operating in different bands, including sub-bands of a single frequency band. The device implements a power control protocol for communications between the device and a similar peer device. The device sets-up the power control protocol by generating a request to use one of the multiple bands to signal power control operations, and to use another one of the multiple bands to transfer data between the device and the peer device. The device sends the request to the peer device and receives a response. Based on the response, the device identifies a control channel band and a data channel band from among the multiple bands.

19 Claims, 9 Drawing Sheets

Related U.S. Application Data continuation of application No. 15/638,550, filed on Jun. 30, 2017, now Pat. No. 10,609,647.

(60) Provisional application No. 62/402,443, filed on Sep. 30, 2016, provisional application No. 62/401,748, filed on Sep. 29, 2016, provisional application No. 62/401,734, filed on Sep. 29, 2016, provisional application No. 62/401,765, filed on Sep. 29, 2016.

(51) Int. Cl.
  *H04W 52/34* (2009.01)
  *H04L 5/00* (2006.01)
  *H04W 52/04* (2009.01)

(52) U.S. Cl.
  CPC ....... *H04W 52/0229* (2013.01); *H04W 52/16* (2013.01); *H04W 52/34* (2013.01); *H04W 52/04* (2013.01); *Y02D 30/70* (2020.08)

(56) References Cited

U.S. PATENT DOCUMENTS

| | | | |
|---|---|---|---|
| 10,972,980 B2 | 4/2021 | Cariou et al. | |
| 2007/0189168 A1* | 8/2007 | Yao | H04L 63/20 370/231 |
| 2011/0065440 A1 | 3/2011 | Kakani et al. | |
| 2011/0255455 A1 | 10/2011 | Seok | |
| 2011/0261755 A1* | 10/2011 | Cordeiro | H04L 1/1621 370/328 |
| 2013/0266136 A1 | 10/2013 | Chu et al. | |
| 2014/0112224 A1* | 4/2014 | Jafarian | H04W 52/0209 370/311 |
| 2014/0370826 A1* | 12/2014 | Amini | H04W 24/02 455/78 |
| 2015/0103713 A1 | 4/2015 | Lee et al. | |
| 2015/0105121 A1* | 4/2015 | Emmanuel | H04W 74/002 455/553.1 |
| 2015/0289299 A1* | 10/2015 | Abraham | H04L 45/245 370/328 |
| 2016/0192293 A1 | 6/2016 | Dai et al. | |
| 2016/0309481 A1 | 10/2016 | Verma et al. | |
| 2017/0311204 A1 | 10/2017 | Cariou et al. | |
| 2018/0020402 A1 | 1/2018 | Emmanuel et al. | |
| 2018/0054724 A1 | 2/2018 | Cariou et al. | |
| 2018/0054838 A1 | 2/2018 | Cariou et al. | |
| 2018/0054847 A1 | 2/2018 | Cariou et al. | |
| 2018/0092039 A1 | 3/2018 | Cariou et al. | |
| 2018/0376374 A1 | 12/2018 | Trainin et al. | |
| 2020/0351783 A1 | 11/2020 | Cariou et al. | |

OTHER PUBLICATIONS

U.S. Appl. No. 16/792,746 U.S. Pat. No. 10,972,980, filed Feb. 17, 2020, AP STA and Non-AP STA Configured for Multi-Band Link-Aggregation in Next-Generation WLANS (As Amended).

"U.S. Appl. No. 15/638,550, Non Final Office Action dated May 1, 2019", 31 pgs.

"U.S. Appl. No. 15/638,550, Notice of Allowance dated Nov. 19, 2019", 10 pgs.

"U.S. Appl. No. 15/638,550, Response filed Jul. 31, 2019 to Non-Final Office Action dated May 1, 2019", 11 pgs.

"U.S. Appl. No. 16/792,746, Corrected Notice of Allowability dated Jan. 15, 2021", 7 pgs.

"U.S. Appl. No. 16/792,746, Notice of Allowance dated Dec. 9, 2020", 15 pgs.

"U.S. Appl. No. 16/792,746, Preliminary Amendment filed Jul. 28, 2020", 9 pgs.

Ali, et al., "Estimating Millimeter Wave Channels Using Out-of-Band Measurements", IEEE, 2016 Information Theory and Applications Workshop (ITA), (Jan. 31, 2016), 1-6.

Kyasanur, et al., "On the efficacy of separating control and data into different frequency bands", IEEE, 2nd International Conference on Broadband Networks, 2005, (Oct. 7, 2005), 1-10.

\* cited by examiner

MULTI-LINK DEVICE CONFIGURED FOR INITIAL POWER MANAGEMENT MODES AFTER MULTI-BAND LINK ENABLEMENT

CROSS REFERENCE TO RELATED APPLICATIONS

This application is a continuation of U.S. patent application Ser. No. 16/792,746, filed Feb. 17, 2020, issued as U.S. Pat. No. 10,972,980, which is a continuation of U.S. patent application Ser. No. 15/638,550, filed Jun. 30, 2017, issued as U.S. Pat. No. 10,609,647, which claims the benefit of priority to U.S. Provisional Patent Application Ser. No. 62/402,443, filed Sep. 30, 2016 and entitled "MULTI-BAND LINK AGGREGATION PRE-NEGOTIATED POWER SAVE MODES OF OPERATION"; Application Ser. No. 62/401,734, filed Sep. 29, 2016 and entitled "MULTI-BAND POWER SAVE POLL PROTOCOL"; Application Ser. No. 62/401,748 filed Sep. 29, 2016 and entitled "MULTI-BAND WIRELESS NETWORK MANAGEMENT (WNM) SLEEP MODE"; and Application Ser. No. 62/401,765 filed Sep. 29, 2016 and entitled "MULTI-BAND AUTOMATIC POWER SAVE DELIVERY PROTOCOL". The content of these applications are incorporated herein by reference in their entirety.

TECHNICAL FIELD

This Application relates to power control for wireless devices and in particular to implementations of power control in multi-band link aggregation wireless systems.

BACKGROUND

Link aggregation of data plane between different Wi-Fi air interfaces on different bands (700 MHz, 2.4 GHz, 5 GHz, 45 GHz, 60 GHz, and others) is being considered for next generation Wi-Fi, Institute of Electrical and Electronics Engineers (IEEE) 802.1 lax wave 2. Link aggregation has short term market relevance. Simultaneous dual band operation (2.4 and 5 GHz) is common in access points (APs) on the market today and tri-band (2.4 5 GHz and 60 GHz) devices have recently been introduced into the market. These devices typically use only one band at a time or use different bands to communication with different stations (STAs). Link aggregation allows a single data stream to be transmitted over multiple bands between a pair of peer devices (e.g. a STA and an AP). Link aggregation can also be applicable to multiple air interfaces in the same band (for example, two independent 802.11ac/ax air interfaces at 5 GHz on two different 80 MHz channels).

DESCRIPTION OF EMBODIMENTS

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. Although the examples below concern IEEE 802.11 Wi-Fi systems, it is contemplated that these principles may be applied to other wireless technologies such as 5G cellular, Bluetooth, and IEEE 802.15 ZigBee.

Figure 1:
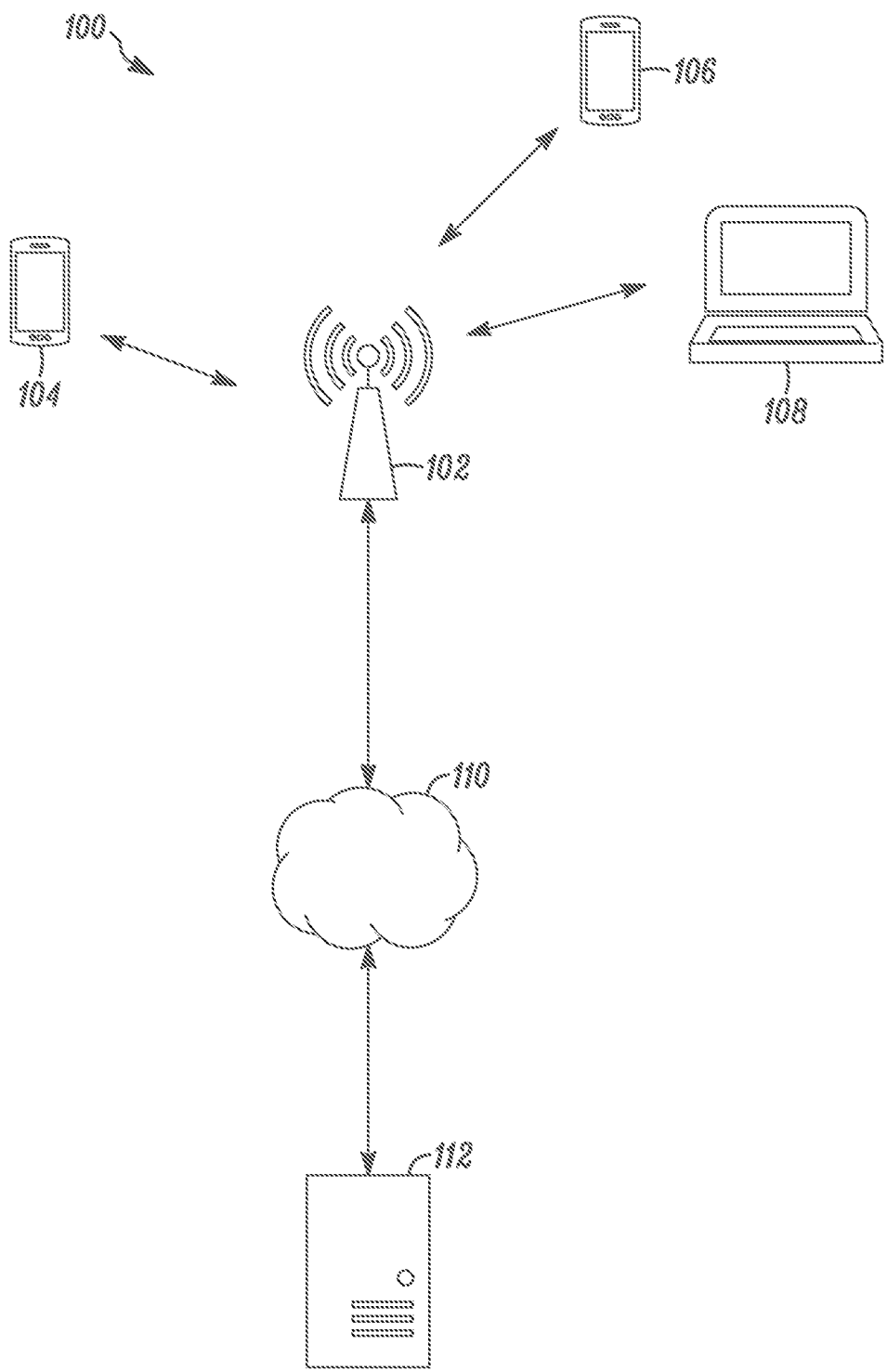
FIG. 1 is a block diagram of an example basic service set (BSS) including an AP and STAs capable of multi-band operation.

An example multi-band Wi-Fi system is shown in FIG. 1, which illustrates a BSS 100 having an AP 102 and three STAs 104, 106, and 108. STAs 104 and 106 are smart phone devices and STA 108 is a portable computer. The AP 102 also has a connection to a network 120, which may be a local area network (LAN) or wide area network (WAN) including a global information network (e.g. the Internet). The example AP 102 and the three example STAs 104, 106, and 108 shown in FIG. 1 are multi-band devices. As described below with reference to FIG. 2, these devices may include multiple transmitters and multiple receivers. The example devices each include three transmitters and three receivers are arranged in respective transceiver pairs operating at 700 MHz, 2.4 GHz, 5 GHz, 45 GHz and 60 GHz. Each of the STAs 104, 106, and 108 operate on battery power and would benefit from a power control mechanism implemented in the system shown in FIG. 1. Briefly, the power control mechanism would remove or reduce power applied to the transmitters, receivers, and associated processing circuitry that are not in use at any given time. Although the transmitters and receivers are described as operating in separate bands, it is contemplated that two or more transmitter-receiver pairs may be configured to operate in the same band, for example, in respectively different 40 MHz, 80 MHz and/or 160 MHz sub-bands (channels) in the 5 GHz band. As used herein, the term "band" encompasses at least the 700 MHz, 2.4 GHz, 5 GHz, 45 GHz, and 60 GHz frequency bands and any of their sub-bands or channels.

FIG. 1 shows an example radio architecture that may be used to implement the AP 102 or any of the STAs 104, 106 or 108. The radio device shown in FIG. 1 includes three radio front-end modules (FEMs) 201, 261, and 291, operating at 700 MHz, 2.4 GHz, 5 GHz, 45 GHz and 60 GHz. Each of the FEMs 201, 261, and 291 is coupled to a respective antenna 202, 262, and 292. The FEMs 201, 261, and 291 are also coupled to respective radio IC and baseband processors 200, 260, and 290. The radio IC and baseband processors 200, 260, and 290, in turn, are coupled to an application processor 251. The FEMs 261 and 291 are architecturally similar to the FEM 201 and the radio IC and baseband processors 260 and 290 are architecturally similar to the radio IC and baseband processor 200, for the sake of brevity, only the FEM 201 and the radio IC and baseband processor 200 are described below.

In some embodiments, the antennas 202, 262, and 292 may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 202, 262, and 292 may each include a set of phased-array antennas, although embodiments are not so limited. Although the antennas 202, 262 and 292 are shown as separate antennas, it is contemplated that one or more of the antennas may be shared among the FEMs 201, 261, and 291.

The example FEM circuitry 201 includes a receive signal path comprising circuitry configured to operate on 2.4 GHz Wi-Fi radio frequency (RF) signals received from the antenna 202, to amplify the received signals and to provide the amplified versions of the received signals to the WLAN radio IC and baseband processor circuitry 200 for further processing. The example FEM circuitry 201 also includes a transmit signal path having circuitry configured to amplify Wi-Fi signals provided by the radio IC circuitry for wireless transmission by the antenna 202.

Figure 2:
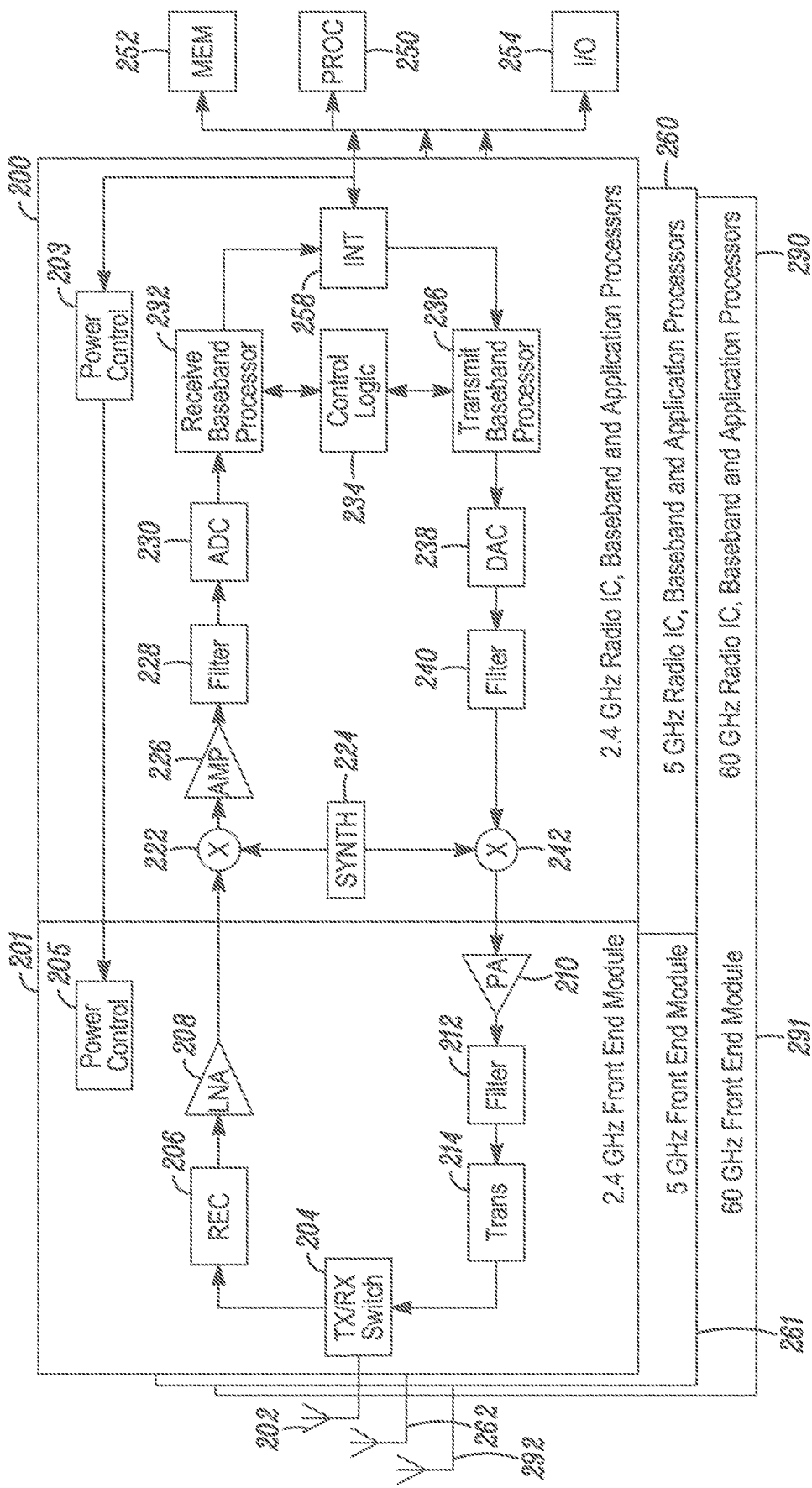
FIG. 2 is a block diagram of an example radio architecture of a multi-band AP or STA.

In some embodiments, the radio architecture shown in FIG. 2 may be part of a Wi-Fi communication station (STA) such as a wireless access point (AP), a base station or a mobile device including a Wi-Fi device. In some of these embodiments, the radio architecture may be configured to transmit and receive signals in accordance with specific communication standards and/or protocols, such as any of the IEEE standards including, IEEE 802.11n-2009, IEEE 802.11-2016, IEEE 802.11ac, IEEE 802.11ad, IEEE 802.11ah, IEEE 802.11ay, and/or IEEE 802.11ax standards and/or proposed specifications for WLANs, although the scope of embodiments is not limited in this respect. The radio architecture may also be suitable to transmit and/or receive communications in accordance with other techniques and standards.

In some embodiments, the radio architecture may be configured for high-efficiency (HE) Wi-Fi (HEW) communications in accordance with the IEEE 802.11ax standard. In these embodiments, the radio architecture may be configured to communicate in accordance with an OFDMA technique, although the scope of the embodiments is not limited in this respect.

In some other embodiments, the radio architecture may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the radio-architecture 100 may include other radio circuitry, such as a cellular radio card configured for cellular (e.g., 3GPP such as LTE, LTE-Advanced or 5G communications).

In some IEEE 802.11 embodiments, the radio architecture may be configured for communication over various channel bandwidths including bandwidths having center frequencies of about 700 MHz, 900 MHz, 2.4 GHz, 5 GHz, 45 GHz, 60 GHz and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous sub-band bandwidths) within the channel bands. In some embodiments, a 320 MHz or larger channel bandwidth may be implemented using multi-carrier aggregation. The scope of the embodiments is not limited with respect to the above center frequencies however.

In some embodiments, the FEM circuitry 201 may include a TX/RX switch 204 to switch between transmit mode and receive mode operation. The FEM circuitry 201 may include a receive signal path and a transmit signal path. The receive signal path of the FEM circuitry 201 may include a low-noise amplifier (LNA) 208 to amplify RF signals received via receiver 206 and provide the amplified received RF signals as an output (e.g., to the radio IC and baseband processor circuitry 200). The transmit signal path of the circuitry 201 may include a power amplifier (PA) 210 to amplify input RF signals (e.g., provided by the radio IC and baseband processor circuitry 200), and one or more filters 212, such as band-pass filters (BPFs), low-pass filters (LPFs) or other types of filters, to generate RF signals for subsequent transmission by the transmitter 214 and the antenna 202 via the TX/RX switch 204. In some embodiments, the FEM circuitry 261 and 291 may include all of the elements of the FEM circuitry 201 and are not further described herein. The example FEM circuitry 201 is configured to operate in the 2.4 GHz frequency spectrum; the FEM circuitry 261 is configured to operate in the 5 GHz frequency spectrum; and the FEM circuitry 291 is configured to operate in the 60 GHz frequency spectrum.

As an alternative to the TX/RX switch 204, the FEM circuitry 201 may be a full-duplex system in which each of the receive path and the transmit path may be coupled to one or more antennas and the receive and transmit paths may be coupled by a self-interference cancellation circuit (not shown) that attenuates the signal from the transmit path in the signals received in the receive path.

An example radio IC and baseband processor circuitry 200 may include a receive signal path and a transmit signal path. The receive signal path of the radio IC portion of the circuitry 200 may include at least mixer circuitry 222, such as, for example, down-conversion mixer circuitry, amplifier circuitry 226 and filter circuitry 228. The transmit signal path of the radio IC circuitry 200 may include at least filter circuitry 240 and mixer circuitry 242, such as, for example, up-conversion mixer circuitry. The radio IC portion of the circuitry 200 may also include synthesizer circuitry 224 for synthesizing a frequency for use by the mixer circuitry 222 and the mixer circuitry 242. The mixer circuitry 222 and/or 242 may, according to some embodiments, each be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 2 illustrates only a simplified version of a radio IC circuitry, and may include, although not shown, embodiments where each of the depicted circuits may include more than one component. For instance, mixer circuitry 222 and/or 242 may each include one or more mixers, and filter circuitries 228 and/or 240 may each include one or more filters, such as one or more BPFs and/or LPFs according to application needs. For example, when mixer circuits are direct-conversion circuits, they may each include two or more mixers. It is also contemplated that the mixer circuitry 222 may include a low-IF (LIF) mixer or a very low-IF (VLIF) mixer.

In some embodiments, mixer circuitry 222 may be configured to down-convert RF signals received from the FEM circuitry 201 based on a synthesized frequency provided by synthesizer circuitry 224. The amplifier circuitry 226 may be configured to amplify the down-converted signals and the filter circuitry 228 may include a LPF configured to remove unwanted signals from the down-converted signals to generate output baseband signals. Output baseband signals are digitized by an analog-to digital converter (ADC) 230 and provided to the receive baseband processing circuitry 232 for further processing. In an AP, the example receive baseband processing circuitry 232 decodes uplink (UL) data and sends the decoded data to the application processor 250 via the network interface 258. In some embodiments, the output baseband signals may be zero-frequency baseband signals, LIF signals or VLIF signals, although this is not a requirement. In some embodiments, mixer circuitry 222 may comprise passive mixers, although the scope of the embodiments is not limited in this respect.

In some embodiments, the mixer circuitry 242 may be configured to up-convert input baseband signals provided by the filter 240 based on the synthesized frequency provided by the synthesizer circuitry 224 to generate RF output signals for the FEM circuitry 201. The baseband signals may be provided by transmit baseband processing circuitry 236, which, in an AP, encodes the down link (DL) data for transmission. The UL data may be converted to analog signals by a digital-to-analog converter (DAC) 238. The analog signals may be filtered by filter circuitry 240 which may include a LPF or a BPF, although the scope of the embodiments is not limited in this respect.

In some embodiments, each of the FEMs 201, 261, and 291 as well as each of the radio IC and baseband processors 200, 260, and 290 may include power management circuitry such as the circuitry 203, and 205 shown in FIG. 2. Alternatively, only the FEM circuitry 201, 261, and 291 may include power management circuitry. The example power management circuitry 205 may be configured to selectively power down the receiver 206 and low noise amplifier 208 or may be configured to selectively power down all of the elements of the FEM 201 in response to a command from the application processor 250. Similarly, the power management circuitry 203 may be configured to selectively power down the mixer 222, amplifier 226, filter 228, ADC 230, and receive baseband processor 232 or may be configured to selectively power down all of the circuitry in the radio IC and baseband processor 200 in response to a command from the application processor 250.

The example receive baseband processor 232 and transmit baseband processor 236 are controlled by control logic 234. Output signals provided by the receive baseband processor 232 are applied to a network interface 258, which also provides signals to the transmit baseband processor 236. The network interface 258, in turn, is coupled to an application processor 250 via a bus 256. The bus 256 is also coupled to interface circuitry (not shown) of the 5 GHz and 60 GHz radio IC and baseband processor circuitry 260 and 290.

In this example, the application processor 250 is coupled to a memory 252 and input/output (I/O) circuitry 254 by the bus 256. The power control mechanisms described below with reference to FIGS. 5-13 may be implemented on one or more of the receive baseband processor 232, the transmit baseband processor 236, the control logic 234 and/or the application processor 250 using power management circuitry 203 and/or 205.

In some embodiments, the mixer circuitry 222 and the mixer circuitry 242 may each include two or more mixers and may be arranged for quadrature down-conversion and/or up-conversion respectively with the help of synthesizer 404. In some embodiments, the mixer circuitry 222 and the mixer circuitry 242 may each include two or more mixers each configured for image rejection (e.g., Hartley image rejection). In some embodiments, the mixer circuitry 222 and the mixer circuitry 242 may be arranged for direct down-conversion and/or direct up-conversion, respectively. In some embodiments, the mixer circuitry 222 and the mixer circuitry 242 may be configured for super-heterodyne operation, although this is not a requirement.

Mixer circuitry 222 may comprise, according to one embodiment: quadrature passive mixers (e.g., for the in-phase (I) and quadrature phase (Q) signal paths). In such an embodiment, RF input signal from the FEM 201 may be down-converted to LIF or VLIF signals that then may be sampled by separate ADCs (not shown) to provide I and Q baseband output signals to be sent to the receive baseband processor 232.

Quadrature phase-related passive mixers (not shown) may be driven by zero and ninety-degree time-varying local oscillator (LO) switching signals provided by quadrature circuitry which may be configured to receive a LO frequency (fLO) from a local oscillator or a synthesizer, such as LO frequency of synthesizer 404. In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signals provided by the FEMs 201, 261, and/or 291 to the radio IC and baseband circuitry 200, 260, and/or 290 respectively may each comprise a balanced signal, although the scope of the embodiments is not limited in this respect. When quadrature modulation is used the I and Q baseband output signals may be provided to a low-nose amplifier, such as amplifier circuitry 226 and/or to filter circuitry such as filter circuitry 228.

In some embodiments, the synthesizer circuitry 224 may be a fractional-N synthesizer or a fractional N/N+1 synthesizer, although the scope of the embodiments is not limited in this respect as other types of frequency synthesizers may be suitable. For example, synthesizer circuitry 224 may be a delta-sigma synthesizer, a frequency multiplier, or a synthesizer comprising a phase-locked loop and a frequency divider. According to some embodiments, the synthesizer circuitry 224 may include digital synthesizer circuitry. An advantage of using digital synthesizer circuitry is that, although it may still include some analog components, its footprint may be scaled down much more than the footprint of corresponding analog synthesizer circuitry. In some embodiments, frequency input into synthesizer circuitry 224 may be provided by a voltage controlled oscillator (VCO), although that is not a requirement. A divider control input may further be provided by either the receive baseband processing circuitry 232 or the application processor 250 depending on the desired output frequency. In some embodiments, a divider control input may be determined from a look-up table (e.g., within a Wi-Fi circuit) based on a channel number and a channel center frequency as determined or indicated by the application processor 250.

In some embodiments, synthesizer circuitry 224 may be configured to generate a carrier frequency as the output frequency, while in other embodiments, the output frequency may be a fraction of the carrier frequency (e.g., one-half the carrier frequency, one-third the carrier frequency). In some embodiments, the output frequency may be a LO frequency (fLO).

In some embodiments that communicate OFDM signals or OFDMA signals, such as through the baseband processor, the transmit baseband processor 236 may be configured to generate OFDM or OFDMA signals as appropriate for transmission by performing an inverse fast Fourier transform (IFFT). The receive baseband processor 232 may be configured to process received OFDM signals or OFDMA signals by performing a fast Fourier transform (FFT). In some embodiments, the receive baseband processor 232 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Although the radio-architecture shown in FIG. 2 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs), and/or combinations of various hardware and logic circuitry for performing at least the functions described herein. In some embodiments, the functional elements may refer to one or more processes operating on one or more processing elements. The software may be configured in a non-transitory computer readable medium such as a random access memory (RAM), read-only memory (ROM), electrically erasable programmable readable memory (EEPROM), magnetic storage device or optical storage device. The software may be configured to cause one or more of the receive baseband processor 232, transmit baseband processor 236, control logic 234, and/or application processor 250 to implement the functions described above.

Figure 3:
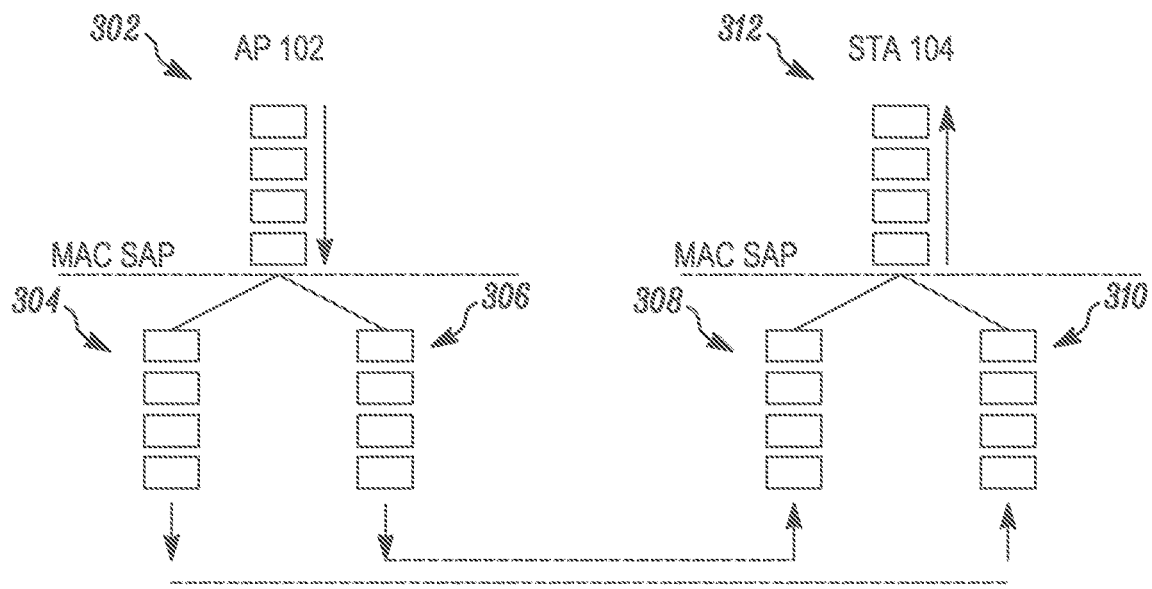
FIG. 3 is a data-transfer diagram that illustrates multi-carrier link aggregation.

As described above, multi-band link aggregation uses multi-band load balancing to send a single data stream over multiple RF bands between two peer STA devices (e.g. AP 102 and STA 104). A multi band load balancing mechanism is illustrated in FIG. 3. A stream of packets 302 from a higher open systems interconnection (OSI) layer (e.g. the application layer) in the AP 102 is load balanced across two or more links 304 and 306. At the STA 104 the individual packet streams 308 and 310 from each link are merged together and delivered, in the original sequence 312, to the upper layer of the STA 104. The lower MAC and PHY layers on each of the links operate independently of each other. With reference to FIG. 2, the lower MAC and PHY layers may be implemented in the FEMs 201, 261, and 291 as well as in the respective radio IC and baseband processors 200, 260, and 290.

Balancing the flow only on one of the two or more links is a particular case of this use case. The multi-band load balanced data flow shown in FIG. 3 is achieved by setting up a link aggregation through negotiation of different parameters (bands, streams, policies etc.) between the peer STAs (e.g. 2 AP 102 and STA 104).

The setup of a multi-band link aggregation mechanism involves a set of request frames configured to allow the system to share multi-band and link aggregation capabilities and to enable setting up a link aggregation link by negotiating the different parameters (bands, streams, policies etc.).

Figure 4:
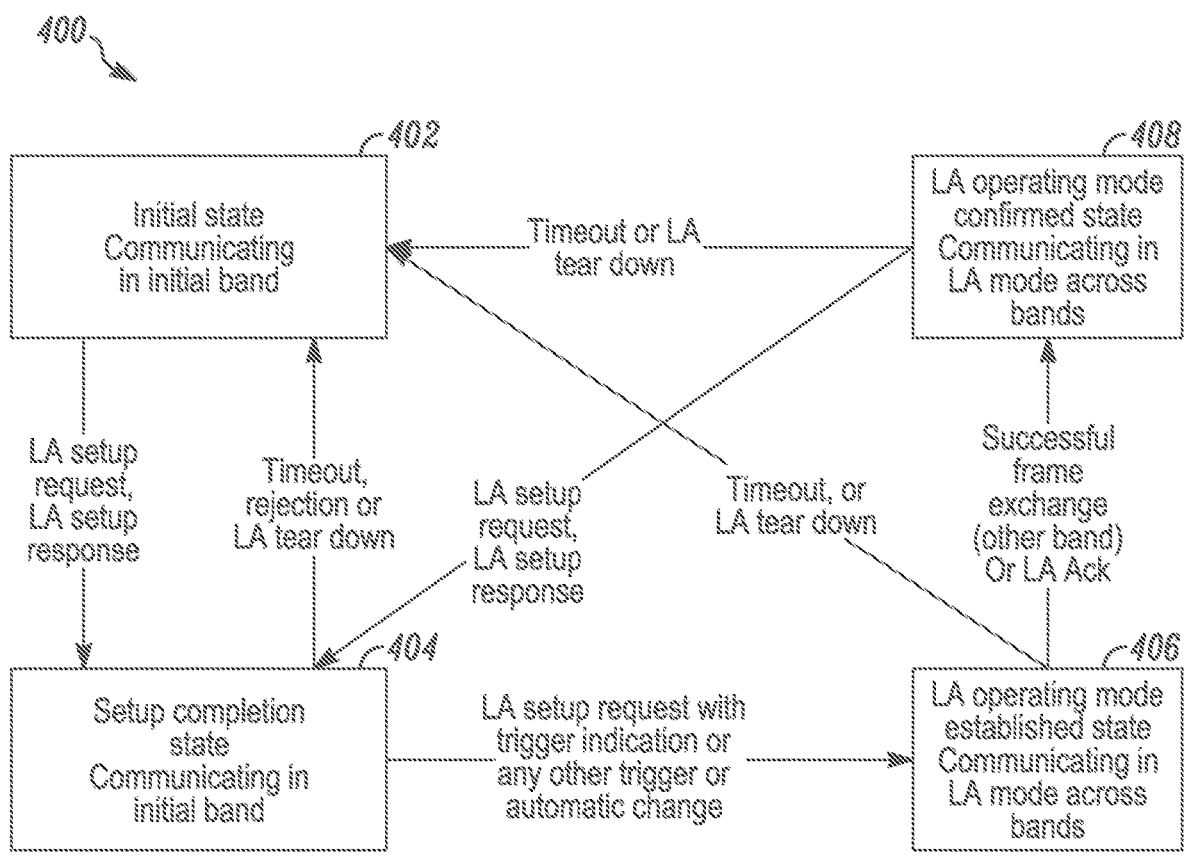
FIG. 4 is a state diagram illustrating an example setup and tear down of multi carrier link aggregation in the BSS shown in FIG. 1.

FIG. 4 shows different states that are used for the multi-band link aggregation setup protocol in a system having multi-band capable STAs. As shown in FIG. 4, the initial state 402 is when multi-band link aggregation has not been established. State 404 is the setup completion state, when multi-band link aggregation has been set up. State 406 is the multi-band link aggregation operating mode established state, when the multi-band link aggregation is implemented on the data plane. State 408 is the multi-band link aggregation operating mode confirmed state, when the multi-band link aggregation is implemented on the data plane, and a successful exchange has confirmed proper operation of the links.

In addition to showing states that allow a system to set-up and break down multi-band link aggregation, FIG. 4 shows signaling that enables the device to switch between different states, especially the link aggregation setup frame requests (LA (link aggregation) setup requests) and setup frame responses (LA (link aggregation) setup responses).

To establish a link aggregation session in the Initial state 402 and transfer it to the Setup Completed state 404, an initiator STA 104 and responder STA 102 exchange link aggregation Setup Request and Setup Response frames. There might be multiple link aggregation Setup Request and link aggregation Setup Response frame transmissions by the initiator STA 104 and the responder STA 102, respectively, until a fast session transfer (FST) session is established between the STAs 104 and 102 becomes established. For this, the responder 102 may use the Status Code field in the link aggregation setup frame, which can be set to a Success value when the responder 102 accepts the LA Setup Request. Alternatively, the Status Code field may be set to a Rejected With Suggested Changes value to propose some other changes or to a Request Declined value to reject an LA Setup Request frame.

A link aggregation session exists in the setup completion state 404, link-aggregation operating mode established state 406, and link aggregation operating mode confirmed state 408. The transition from the setup completion state 404 to the link aggregation operating mode established state 406 can be automatic either instantaneously or after a pre-agreed interval. Alternatively, the transition from state 404 to state 406 can be triggered by a specific trigger frame (similar to the LA setup frame but with specific trigger information). The transition from state 404 to 406 can also be triggered by a specific timeout, or by a specific event.

The transition from the link aggregation operating mode established state 406 to the link aggregation mode confirmed state 408 occurs when a successful frame exchange has been performed on all the bands that are different from the one used in the initial state.

The transition from state 408 to state 404 occurs when there is a change in the link aggregation parameters, such as a change in the policy for a data stream, entering a power save mode on one or more bands of the link aggregated channel, or a change in the band, channel, or AP used to transfer the data stream. The transition from state 408 to state 404 can be done by exchange of a link aggregation setup frame, or by a trigger frame.

At every state 404, 406, and/or 408, a STA may transmit a link aggregation tear down frame to the peer STA in the link aggregation session in order to tear down the session that was previously set up using the link aggregation protocols described above. Upon transmission or reception of a link aggregation tear down frame, the initiator and responder transition to the Initial state 402 effectively terminating the link aggregation session.

Although states 402, 404, 406, and 408 are shown as separate states, it is contemplated that states 404 and 406 can be merged into a single state, if the transition between states 404 and 406 is always automatic. Furthermore, state 408 can be merged with state 406 if the protocol is modified such that a successful exchange on another band is not needed to validate the link aggregation session.

The materials above describe a protocol for negotiation of multi-band link aggregation setup. The materials that follow describe several examples that enable multi-band power savings by modifying the initial setup protocol to include pre-negotiated power save states/operating modes. These negotiations enable fast switching between or among pre-defined power save modes of operation during the link aggregation operating phase. For example, it may be desirable to have a power save mode of operation with only one band active (so that management information may be received), and one active multi-band mode where multiple bands are active so that data can be efficiently transferred. The examples presented below describe several modifications of the multi-band link aggregation setup protocol, which allow the peer STAs to negotiate and implement different power save modes.

Each example power save mode of operation is characterized by different parameters (e.g. setting active bands/channels/interfaces, determining a band or bands for sending management traffic, setting the format of the management traffic, determining what traffic is sent and allocating a band or bands for the data traffic). The link aggregation setup assigns a specific identifier (ID) to each power save mode and may set conditions for switching from one power save mode of operation to another (e.g. specifies tools to trigger a transition from one mode to another (short feedback, countdown, etc.) and specifies which STA can trigger the switch).

Once in the link aggregation operating mode confirmed state, the STAs can switch from one power save operating mode to another by following the conditions defined in the negotiation phase of the multi-band link aggregation setup protocol. Because the power save modes are set up during the link aggregation setup, the system allows fast switching among the different power save modes of operation depending, for example, on the traffic. Having the preset power save modes also enables combining multi-band link aggregation with fast session transfer (FST). Note that this power save protocol can be used in systems having multi-band operation without any link aggregation in the data plane.

As described above, an aggregated multi-band channel may span more than one RF band. As used herein, the term "band" includes both individual RF bands, their sub-bands and aggregated multi-band channels including bands and/or sub-bands.

The example power save negotiations may add several information elements (IEs) to the multi-band link aggregation setup request and response frames, several new elements. These IEs include: a) multi-band power save mode of operation IEs, b) multi-band power save mode transition IEs, and c) multi-band power save mode of operation IEs.

Figure 5:
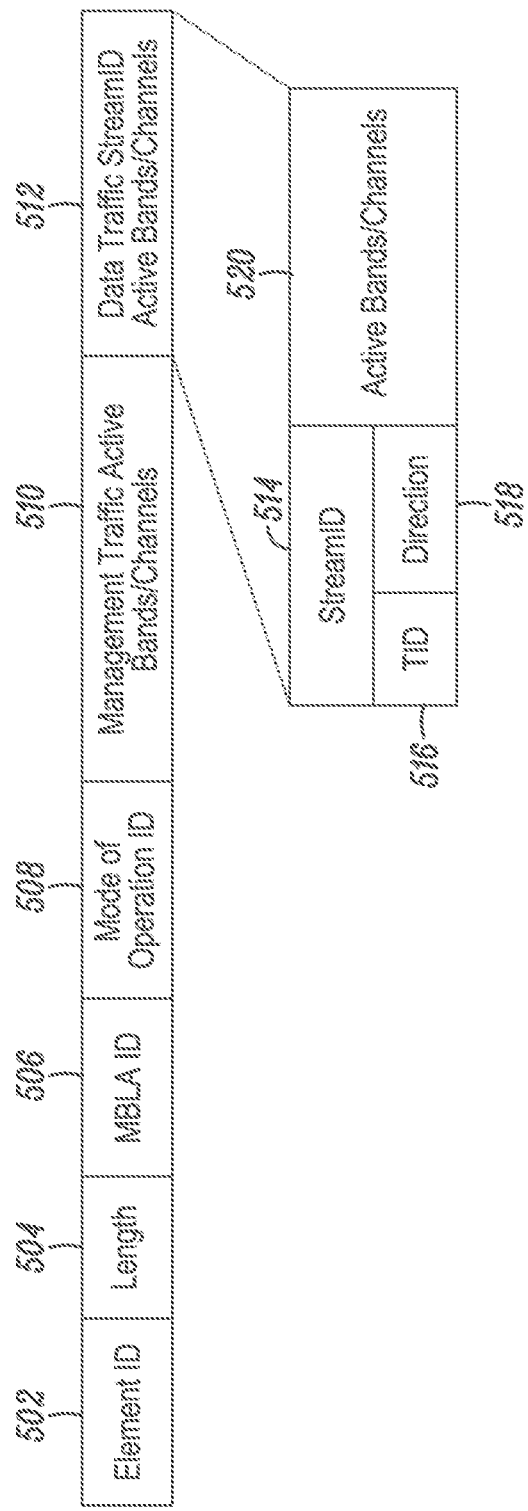
FIG. 5 is a data diagram of an example information element (IE) that may be used to configure power control during the setup of multi-carrier link aggregation.

The multi-band power save mode of operation IEs describe the different power save modes of operation. Each power save mode of operation has a distinct IE. An example multi-band power save mode of operation IE is shown in FIG. 5. The element ID field 502 identifies the IE. The IE also includes a length field 504 which specifies a number of octets following the element ID that constitute the IE. The IE includes a power save operation ID field 508, which allocates an identification (ID) field to the power save mode of operation. The IE may also include an optional multi-band link aggregation ID (MBLA ID) field 506 that identifies an MBLA to which these modes apply. Field 510 contains a list of bands/channels used for management traffic, among the list of bands/channels defined in the multi-band power save element that are active or inactive. Field 510 may include, for example, a bitmap of the bands/channels defined in the multi-band element. Each bit in the multi-band element corresponds to one band/channel defined in the multi-band element. A bit in the field set to one indicates that the corresponding channel is active and a bit set to zero indicate indicates that the corresponding channel is inactive.

The IE also contains a field, 512, for each data path traffic stream. A stream ID identified as each data path in traffic stream. For each stream ID, the field 512 includes a subfield that describes the stream including a traffic stream ID 514 defined by a traffic ID (TID) value 516 and a direction value 518. The field 512 may also include a subfield 520 having a list of bands/channels used for this stream ID. The bands/channels in this field are selected from among the list of bands/channels defined in the multi-band element, which are active or inactive. The subfield 520 may, for example, include a bitmap of the bands/channels defined in the multi-band element, each bit corresponding to one band/channel defined for the multi-band element. A bit is set to one to indicate that the corresponding band/channel is active and is set to zero to indicate that the corresponding band/channel is inactive.

The multi-band link aggregation setup request and response frames may also include multi-band power save mode transition IEs. These IEs contain information used to negotiate how the transitions are made between or among the different powers save modes The format of the power save mode transition IEs is similar to that shown in FIG. 5. The example IE may include an optional MBLA ID field that identified the MBLA to which these modes apply. The example IE also includes two multi-band power save modes of operation ID fields, one for each of the two modes covered by the transition. The example IE includes a transition direction field, that defines if this power save element describes transitions from the first power save mode to the second power save mode, from the second power save mode to the first power save mode or for both the first power save mode to the second power save mode and the second power save mode to the first power save mode. The IE also includes a power save transition initiator field that defines which of the STAs can begin the power save transition. This field specifies whether only the initiator, only the responder, or both the initiator and the responder can begin the transition. The example IE may also contain one or more power save transition type fields that indicate possible ways to trigger a power save transitions. These include a frame similar to an OMN frame; feedback piggybacked with data frames or with block acknowledgments BAs, using HE control field for instance, by defining a new feedback type, or by enhancing the receiver operating mode notification (ROMI); and/or a link loss countdown (LLC). The LLC is a countdown that starts from a predetermined value is decremented over time. It is reset to the predetermined value every time a packet is received from the peer STA. It is used to detect loss of the signal from the peer STA. Such a loss can trigger a power save mode transition.

The power save mode transition IE may also include a field to indicate that the new band is to be confirmed after the transition. This confirmation is similar to a confirmation that may be made when transitioning from the LA operating established state 406 to the LA operating confirmed state 408 as shown in FIG. 4. This confirmation can be provided by a successful frame exchange or a link aggregation acknowledgment (ACK) frame. These elements are included in the negotiation in which the multi-band link aggregation setup request and response frames are exchanged until an agreement is reached between the peer STAs.

Transitions can occur during the LA operating mode confirmed state, between different predefined power-save modes of operation, according to the different triggers defined in the transition IE. Depending on the types of triggers, a confirmation of the transition can be provided. In such case, sending a trigger may lead to transition the state from the LA operating mode confirmed state 408 to the LA operation established state 406, as shown in FIG. 4. A successful frame exchange or a link aggregation ACK in the new band/channel may cause the system to transition back to the LA operating mode confirmed state 408.

It is noted that the example devices and methods may be implemented in multi-band systems that do not implement multi-band link aggregation. In one example, a STA can be connected to multiple APs on different bands but connected to only one AP at a time using multi-band operations (MBO) and/or optimized connectivity experience (OCE) features. The STA may perform a transition to a different BSS when switching from one band to another. The STA can have a specific multi-band power save setup protocol, specifically for the use in power save transitions. The same protocol can be exploited for the negotiation of the multi-band power save modes. For example, a STA can be connected to a 5 GHz AP, setup a multi-band power save with two modes of operation, one for operation on the 5 GHz AP and one for operation on a collocated 60 GHz AP. When the trigger is sent to transition from the 5 GHz AP to the 60 GHz AP, the STA may perform a BSS transition (possibly with fast BSS transition) to move from the 5 GHz AP to the 60 GHz AP.

Figure 6:
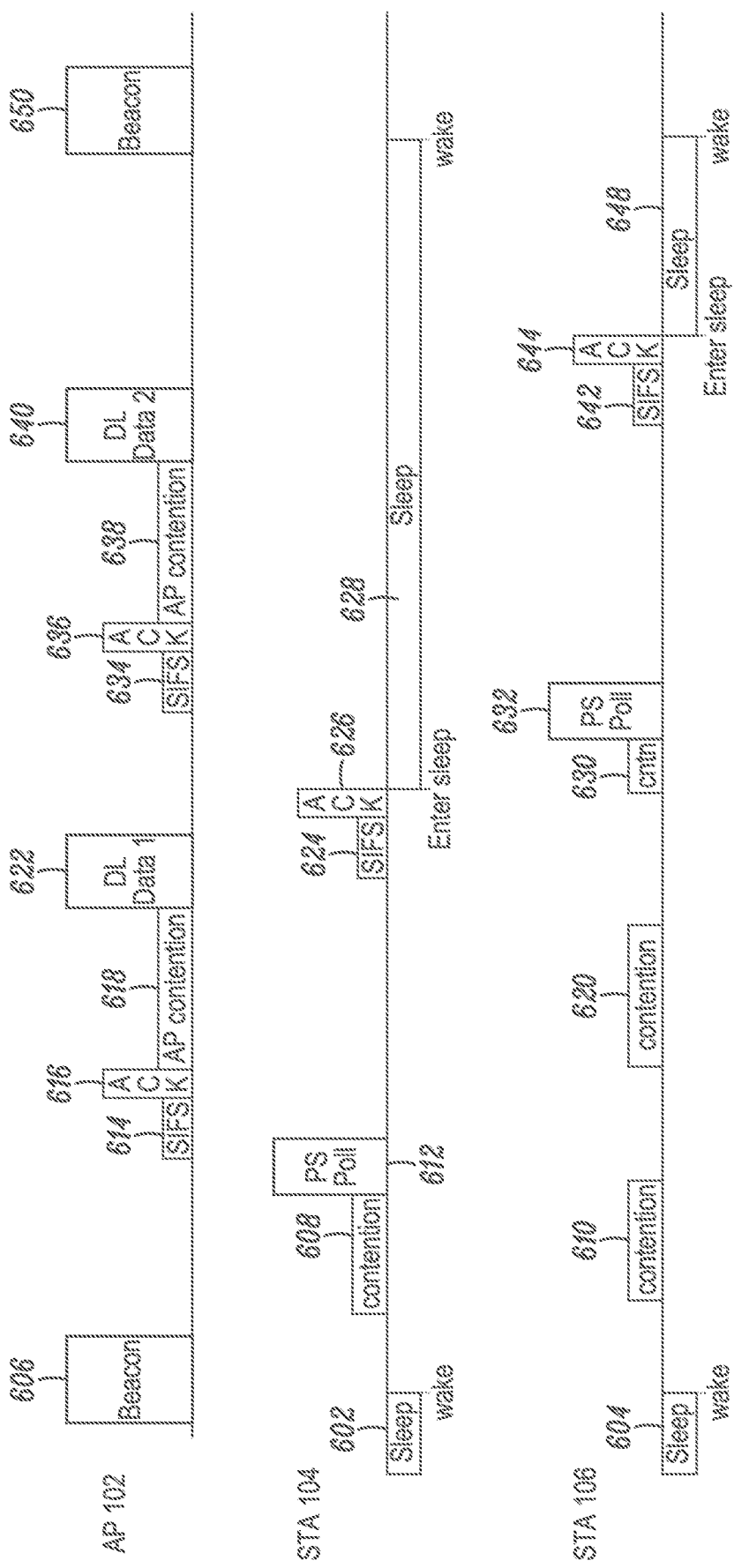
FIG. 6 is a timing diagram showing an example power save (PS) mechanism.

The power save set up request and response protocol described above may be used to extend existing power save protocols to multi-band and multi-band link aggregated systems. The IEEE 802.11 standards define a power save (PS) mode power management protocol known as power save polling (PSP) protocol which is shown in FIG. 6. According to the PSP protocol, a non-AP STA can be in one of two power management modes, an active mode in which the STA receives and transmits frames at any time and a power save (PS) mode in which the STA enters the awake state to receive or transmit frames. A STA in the active mode remains in the awake state. The STA remains in a doze or sleep state otherwise.

With reference to FIGS. 1 and 6, in the PSP scheme, a STA 104 and/or 106 enters power-save mode (sleep state) by sending, to the AP 102, a Null frame having the power management bit set. FIG. 6 shows the STAs 104 and 106 in the sleep state at 602 and 604, respectively. After receiving the Null frame, the AP stores all packets destined for the STA in a per-STA queue. The AP 102 sets a traffic indicator map (TIM) field in the beacon frame at 606 to indicate that packet data destined for the STAs 104 and 106 is queued at the AP 102. The traffic indicator map may be a bitmap having one bit for each non-AP STA 104 and 106 in the BSS. At the end of the sleep states 602 and 604, both STAs 104 and 106 wake up to receive the beacon frame. When the STA detects that its corresponding bit in the TIM field has been set, the stay sends a PS-Poll frame to the AP 102. At 608 and 610, STAs 104 and 106 both contend for the channel. STA 104 wins the contention and, at 612 sends the PS Poll to the AP 102. The AP 102 receives and acknowledges the PS Poll at 614 and 616, respectively. At 618 and 620 the AP 102 and STA 106 contend for the channel. The AP 102 wins the contention and, at 622, sends the first queued frame to the STA. The STA 104 receives and acknowledges the queued data frame at 624 and 626, respectively. The ACK sent at 626 has the power management bit set indicating that STA 104 will enter the sleep state at 628 until the next beacon time at 650. Alternatively, if the More Data field had been set in the frame received at 624, the STA would have sent another PS-Poll frame to the AP and would have received the additional data. The STA would have continued to send PS-Poll frames to receive all the queued frames until none are left.

At 630, STA 106 wins the contention and sends a PS-Poll frame to the AP 102. At 634 and 636, the AP 102 receives and acknowledges the PS-Poll. At 638 the AP 102 contends for the channel and at 640 sends a queued data frame to STA 106. STA 106 receives and acknowledges the queued data frame at 642 and 644 respectively and enters a sleep state at 648 until the next beacon time 650.

Using this scheme, it is also possible to exit power-save mode upon detecting queued frames by sending a Null frame or an ACK with power management bit turned off. In this instance the AP can send all of the queued frames to the STA. The STA can then re-enter power-save mode by sending a Null frame with Power Management bit turned on. After sending the Null frame with the power management bit turned off, the STA may wait for a short period of time during which, if it has not received any frames from the AP, the STA deduces that there are no outstanding queued frames to be sent to the STA by the AP and transitions to the sleep state.

The STA may negotiate an activity pattern for communication with the AP. The activity pattern may set a duty cycle for the STA that is recognized by the AP. For example, the activity pattern may be set to 95 milliseconds unavailable and 5 milliseconds available in a 100 millisecond cycle. The activity pattern saves power because it limits the time that the STA is activated to receive a beacon from the AP. Once negotiated, the activity pattern can be activated by sending an activation frame and deactivated by sending a deactivation frame. When the activity pattern is deactivated, the STA is always available so there is no power saving due to the limited duty cycle. The start of the activity pattern can be relative to the activation frame, for example, it can be set to start 20 milliseconds from start TX time. Alternatively, the activity pattern can be relative to the broadcast frame, for example it may start 30 milliseconds after the transmission of a beacon.

The IEEE 802.11 standard defines a delivery traffic indication map (DTIM) as a kind of TIM. The DTIM informs the STAs of the presence of buffered multicast/broadcast data for the STA on the access point. The DTIM is generated within the periodic beacon at a frequency of occurrence specified by the DTIM Interval. Following the DTIM beacon, the AP sends multicast/broadcast data. In order to ensure receipt of the broadcast/multicast data, STAs in PS-mode may wake up every DTIM period in order to determine if the AP has a multicast/broadcast data stream for the STA.

These existing PS power management schemes may be adapted to a multi-band framework and in particular to a multi-band link aggregation framework using the set up protocols described above. To make this adaptation, the TIM and DTIM fields included in beacons may be adapted to the multi-band framework. In particular, in a multi-band framework a STA and AP can communicate over multiple bands. One of these bands may be designated as a primary band, a power save mode band, or a control channel band and another band may be designated as secondary band, an active mode band, or a data channel band.

To adapt the existing PS schemes to the multi-band framework, the setup protocol may specify on which bands TIM and DTIM are sent and on which bands PS polls and/or power management Null frames are sent. The protocol may also specify on which bands buffered packets are to be sent when the STA transitions from the doze or sleep state to the active or awake state. The setup protocol may also define rules for the transition among the different power save states in each of the bands.

The multi-band link aggregation set up negotiation establishes the different parameters that govern multi-band PSP. These parameters may include: configuration of the TIM signaling; PS operation mode change signaling; AP PS feedback, in particular the Null frame signaling; and multi band multicast/broadcast transmission indication signaling.

To illustrate the adaptation of the existing IEEE 802.11 PS operation modes, consider that an AP 102 and STA 104 have established and negotiated a multi-band link aggregation session, and/or a multi-band power save session. As an example, a band identified as the primary band, the band is used as a control channel band, and/or as the band considered as being used in power save mode when no data are exchanged. Another band or bands, identified as secondary bands, are bands used to transfer data and/or as the bands considered as being used in active mode when data are exchanged.

Note that with data link aggregation, each of these bands may actually be include bands that are aggregated. The primary band and secondary band may therefore be considered to be logical channels. The example extended PSP operation methodology and signaling includes a negotiation of multi-band PS parameters for a common PS operation, These parameters may include beacon PS notification, in particular TIM signaling that may include a single band TIM signaling for one or more multi-band PS operation modes and an extended multi band TIM format. the negotiations may also define PS operation mode change notification signaling including multi-band PS-Poll notifications and rules to transition between/among the different power save modes in each of the bands. The negotiations may also establish PS feedback to the AP, in particular a multi-band Null frame PS signaling scheme and a multi-band Null frame PS notification scheme. the multi-band link aggregation setup protocols may also extend the current PSP signaling to support multi band doze states and multi band deep sleep states.

One example extends the legacy power save protocol (PSP) to a multi-band operation, in order to control the transitions of the STA between the active or awake state, doze states, and deep sleep states of the STA. This modification uses signaling transmitted on one of the operating bands, by specifying that, during the negotiation/initiation of the multi-band PSP, the AP indicates which band/channel is used to transmit the beacon having the TIM and which band/channel is used to transmit the buffered packets. For example, the TIM element can be included only in the beacons of the primary band, not in the beacons of the secondary band. Alternatively, the TIM element can be present in all bands.

Figure 7:
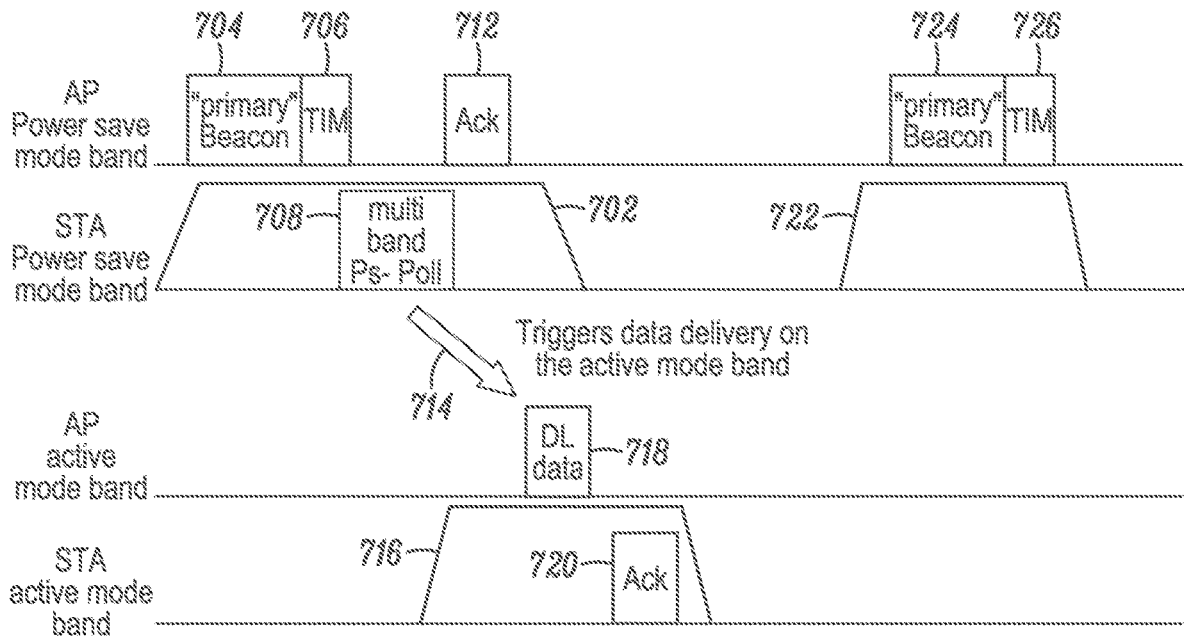
FIGS. 7 and 8 are timing diagrams showing an adaptation of the power save mechanism shown in FIG. 6 a system using multi-carrier link aggregation.

The TIM element can be the same as in the current IEEE 802.11 standards, in which case, the STAs implicitly know, thanks to prior negotiation, on which band to receive the buffered data. Alternatively, the TIM element can be modified to contain multi-band TIM information (e.g. an explicit indication of the secondary or active mode band on which to receive the buffered data). Referring to FIG. 7, the AP stores all packets destined to each STA in a per-STA queue of the secondary band. The STA transitions to the awake state at 702 and receives the beacon and TIM transmitted by the AP at 704 and 706, respectively. The STA receives a beacon in the primary band with the multi-band TIM element indicating buffered data for the STA. At 708, the STA sends a PS-poll or a multi-band PS-poll frame on the primary, or power save band. Depending on the configuration, the STA may alternatively send a PS poll frame on the secondary band. After the AP acknowledges the PS poll frame at 712, the STA enters the sleep mode until the next beacon time at 722. As indicated by the arrow 714, after acknowledging the PS-Poll, the AP, at 718, sends the DL data frame to the STA in the secondary band. After acknowledging the data frame at 720, the STA enters the active or awake mode on the secondary band. The STA receives and acknowledges the DL data frame at 720 and then enters the deep sleep state on the secondary band.

During the negotiation/initiation of the multi-band PSP, the STA and AP can also negotiate which band to use for the multi-band PS-Poll (e.g. on the power save band only, or on the active mode band only, or on both bands). Similarly as in the current IEEE 802.11 standards, the legacy PS-poll can be used when such use has been negotiated beforehand. Alternatively a new multi-band Ps-Poll can be defined to include explicit information on the band for which the PS-Poll indicates a change in the power save state.

Figure 8:
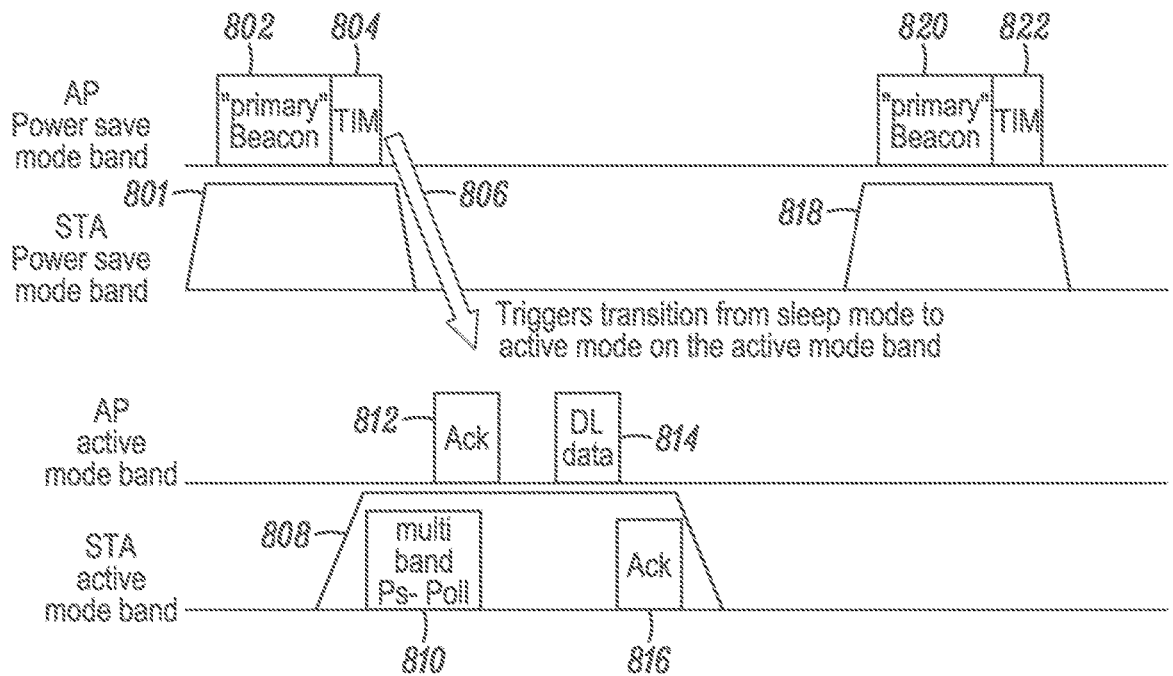

FIG. 8 shows another example of a multi-band PS-Poll implementation. At 801, the STA awakens from the sleep state to receive the beacon 802 and TIM 804 from the AP. In response to receiving the TIM indicating the presence of data for the STA, the STA transitions its secondary band from a deep sleep state and sends a multi-band PS-Poll to the AP at 810. The AP acknowledges the multi-band PS-Poll in the secondary band at 812 and sends the buffered packet data, also in the secondary band at 814. The STA receives and acknowledges the data at 816 and again enters the deep sleep state. At 818, the STA awakens on the primary band to receive the beacon and TIM at 820 and 822, respectively. As described above, successful reception of a PS-poll or multi-band PS-poll frame by the AP on the primary band may trigger the sending of buffered packets to the STA on the secondary band, immediately, or after a delay negotiated when setting up the multi-band PSP.

When the STA receives the ACK in response to its PS-Poll or multi-band PS-Poll on the primary band, the STA can go back to doze state (or deep sleep state) in the primary band, while it transitions from doze state (or deep sleep state) to active or awake state in the secondary band. When the STA successfully receives the buffered packets on the secondary band and the last buffered packet having the More Data field is set to zero, the STA may automatically transition to doze state (or deep sleep state) in this band. On the primary band, it continues to regularly wake up to listen to beacons and read TIM element received on the primary band.

Alternatively, the STA can switch between PS mode and active mode as with the legacy protocols, by sending null frames or multi-band null frames with power management set to one or set to zero, or by changing its operating mode with an operating mode notification (OMN) of with a receive operating mode notification (ROMI) in a high-efficiency (HE) control field piggy backed with data or with an ACK.

When the STA receives a beacon in the primary band with the multi-band TIM element indicating buffered data for it, the STA can also send a Null frame with the Power Management bit turned off, or with a ROMI field in an HE control field to indicate that the STA is changing the PS operating mode on a specific band. As described above, this Null frame can be sent on the primary or the secondary band, or on both, depending on the negotiation. As described above AP would send all the buffered data to the STA.

A multi-band DTIM may sent on the primary or power save band every DTIM period. According to a multi-band power save negotiation, multicast/broadcast data may be sent on the secondary band after a delay (e.g. Multi-band-PSPTransitionDelay) after the DTIM transmission on the primary band. The length of the delay can be negotiated during the initiation of the multi-band power save mode. During negotiation the AP and the STA may also decide on which band or bands the broadcast/multicast data packets are sent.

A multi-band PSP mode can be established between an AP and a STA by negotiating (or imposing) the different following multi-band parameters: which band to use for the TIM elements; which band to use for the DTIM elements; which band to use by the STAs to send the multi-band PS-polls or multi-band null frames having power management change (or PS operating mode change); which band to use to send the buffered data (indicated in TIM element) once the STA is in active mode after the Ps-Poll; which band to use to send the broadcast/multicast data (indicated in DTIM element); and the length of the Multi-bandPSPTransitionDelay between the time at which the Ps-Poll is received by the AP and the time the AP transmits the broadcast/multicast data.

As described above, in the example systems may operate using legacy PS-Poll, legacy null frames with power management bits, and also using legacy TIM and DTIM elements. Alternatively, the protocol may define a new multi-band PSP with new frames (new multi-band PS-Poll, new TIM and DTIM element, new Null frames with power management bits). The legacy PS-Poll specifies when the STA transitions from doze state to active state. A new multi-band PS-Poll may also indicate on which band the STA transitions from the doze state to the active or awake state. In this implementation, the multi-band PS-Poll includes a list of bands (band IDs or logical channel IDs) that are to transition from the doze state to the active or awake state.

The simple adaptation for multi-band operation is to have multiple TIM/DTIM elements. The first TIM element may be a legacy TIM element that indicates the presence of buffered data in the current band (i.e. The band on which the TIM/DTIM is sent). The other TIM/DTIM elements are multi-band elements that each include the same bitmap as the TIM/DTIM element but also includes also a field indicating the band on which the data indicated in the multi-band TIM/DTIM will be delivered. There may be a multi-band TIM/DTIM for each band. In this example, the TIM/DTIM and multi-band TIM/DTIM may be transmitted only on the primary band. The multi-band TIM/DTIM may also indicate the ID of the secondary band.

Currently a change in power save state can be indicated using a Null frame having a power management bit or and HE control field with a ROMI. It is contemplated that this may be adapted to multi-band systems by explicitly indicating to which band or bands power save state changes apply. This indication may use a modified HE control field or a new variant of the HE control field.

Another implementation of multi-band power control involves the use of wireless network management (WNM) sleep mode. The IEEE 802.11 standard defines a WNM sleep mode that enables a non-AP STA to signal to an AP that the STA will be sleeping for a specified length of time in a synchronized way. This enables the STA to reduce power consumption and remain associated with the AP while the non-AP STA has no traffic to send to or receive from the AP. The WNM sleep mode can also define and amount of information (e.g. MAC protocol data units (MPDUs) per traffic stream ID (TID)) that the AP can send to the non-AP STA during the wake up period.

Figure 9:
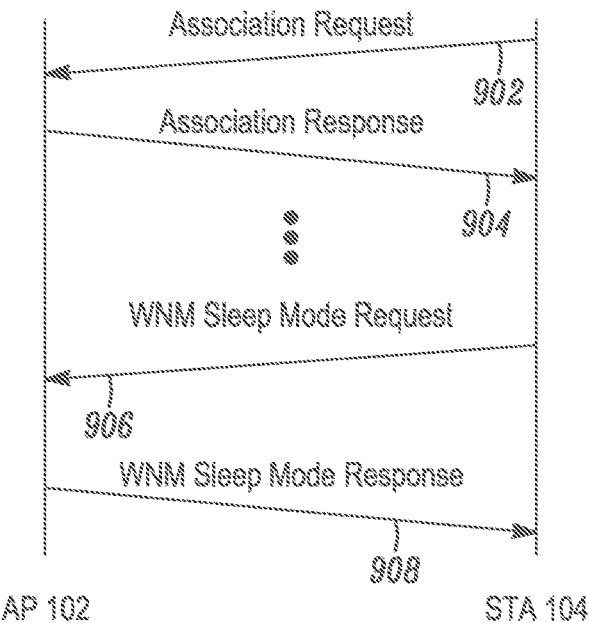
FIG. 9 is a timing diagram that illustrates a wireless network management (WNM) power management scheme.
Figure 10:
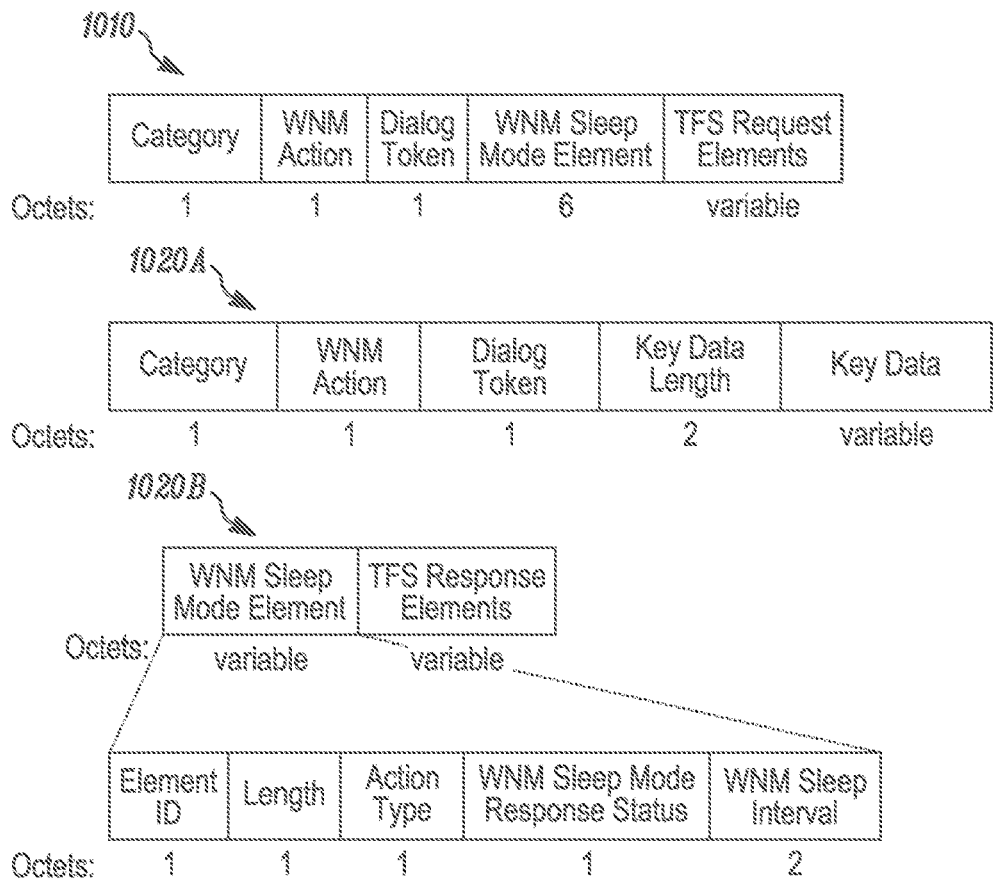
FIG. 10 is a data diagram that is useful for describing the WNM power management scheme shown in FIG. 9.

As shown in FIG. 9, in the existing IEEE 802.11 standard, the STA 104 indicates to the AP 102 that it supports WNM-Sleep Mode by setting the WNM-Sleep Mode field to 1 in the Extended Capabilities IE in the Association Request Frame 902. The AP 102 then decides the Max Idle Period it can support based on the available resources and notifies the STA 104 of the Max Idle Period in the Association Response Frame 904.

In operation, the STA 104 requests permission to enter WNM-Sleep Mode 906 and optionally also indicates the actual wake up time in the WNM-Sleep Interval field in the WNM-Sleep Mode Request frame 906 if the STA wishes to receive group-addressed traffic (i.e. broadcast/multicast data) indicated in the DTIM. In response to the Sleep Mode Request frame, the AP 102 may grant or deny permission to enter WNM-Sleep Mode 908.

The examples described below show how the current single band IEEE 802.11 power management with WNM sleep mode may be adapted to a multi-band framework. In particular, the WNM sleep mode protocol may be adapted to multi-band operation, in order to control the transitions between active mode and WNM sleep mode of the STA on the different bands (e.g. primary and secondary bands).

The adaptations include modifying the beacon PS notification and in particular modifying the TIM signaling that supports WNM sleep mode. In addition, the examples below describe modifications of the multi-band WNM sleep mode capability exchanges and modifications of the multi-band WNM sleep mode requests and responses in order to enable the transitions to/from WNM sleep mode on different bands.

For one example, an AP and STA have established and negotiated a multi-band link aggregation session, or a multi-band power save session. In this example, the primary band is the band used as a control channel band, and/or the band considered as being used in power save mode when no data is exchanged by the AP and STA. The secondary band(s), are the band used as data channel band(s), and/or as the band(s) considered as being used in active mode when data is exchanged between the AP and the STA. As with the previous examples, the data link aggregation secondary band can actually be multiple bands that are aggregated. Thus, the primary band and secondary band may be understood as being logical channels.

The signaling sent over the primary band can include a Beacon WNM PS notification for all operating bands and multi-band WNM sleep mode capability exchanges for all relevant secondary operating bands.

The existing multi-band sleep mode capabilities exchange may be modified to indicate whether and on which bands multi-band WNM sleep mode is supported. This signaling can also indicate parameters for applicable operation modes and for other WNM sleep mode operation operations for each band.

Multi-band WNM sleep mode enables an extended multi-band power save operation methodology for non-AP STAs in which a non-AP STA does not listen for every DTIM Beacon frame at every band, and need not perform group temporal Key (GTK) or integrity group temporal Key (IGTK) updates for a non-broadcast data service. STAs in WNM sleep mode can wake up, only on one band, as infrequently as once every WNM sleep interval to check whether the corresponding TIM or DTIM bit is set or to check whether group addressed traffic (broadcast/multicast) is pending.

To support this multi-band WNM sleep mode operation methodology, the existing protocol may be modified such that a non-AP STA can make a request on any previously specified primary band to enter WNM sleep mode on any previously specified secondary band(s) and also to indicate on which band and with which sleep interval it will wake up to check for pending TIM or DTIM traffic.

For example, a non-AP STA can send a multi-band WNM sleep mode IE to an AP on the primary band to indicate that it intends to transition to WNM sleep mode on the primary and/or the secondary bands and that it intends to wake up periodically only on the primary band to check for TIM and DTIM information.

To transition from multi-band WNM sleep mode to active mode, the non-AP STA can send a multi-band WNM sleep mode IE to the AP on the primary band with an Action Type field in the WNM Sleep Mode element set to Exit WNM Sleep Mode to indicate that the non-AP STA intends to transition to active state on the secondary band only (or on both bands or only on the primary band) and that the non-AP STA will be ready to receive the buffered data on these bands.

This example extends the existing WNM sleep mode request/response frames to provide new multi-band WNM sleep mode request/response frames. The existing WNM sleep mode request frame is shown as data structure 1010 in FIG. 10 and the response frame is shown as data structures 1020A and 1020B.

Figure 11A:
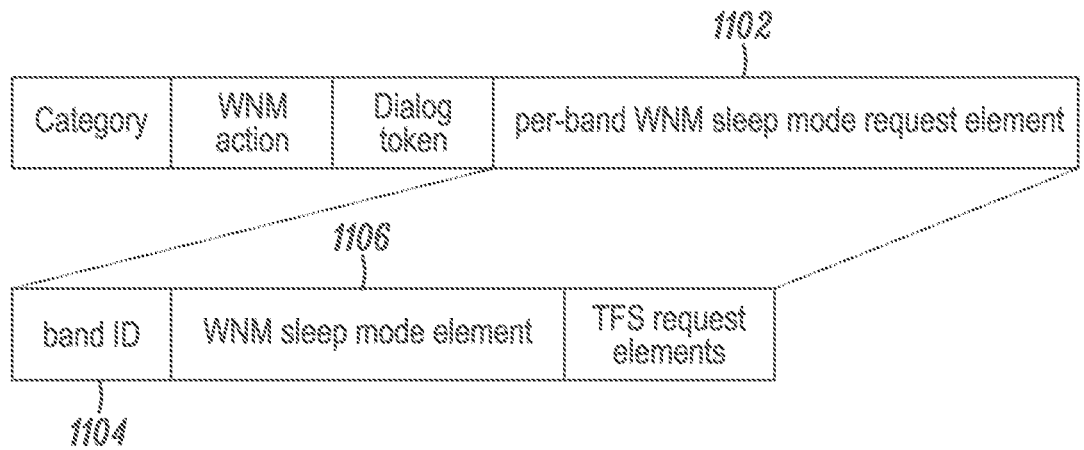
FIGS. 11A and 11B are data diagrams showing an adaptation of the WNM power management scheme for a multi-carrier link aggregation system.

One example, shown in FIG. 11A, defines a new multi-band WNM sleep mode request frame that includes multiple WNM sleep mode sub-elements 1102, one for each band and/or channel of the multi-band system. Each per-band WNM sleep mode sub-element includes a field 1104 indicating the band and/or channel to which it applies and a WNM sleep mode element 1106 that include at least the WNM sleep interval. Each band in/or channel can have WNM sleep mode element information that is different from the information in any other band and/or channel.

To indicate that the STA will wake up only on the primary band and/or channel (and not on the secondary band and/or channel), the example defines a specific value (255 for instance) in the WNM sleep interval for the secondary band(s) and/or channel(s).

Another example, shown in FIG. 11A defines a new multi-band WNM sleep mode request that adds additional information on the band in which the non-AP STA will wake up to detect TIM/DTIM elements. This example adds a band ID field 1104 in the WNM sleep mode request, or in the WNM sleep mode element. The added band ID field implicitly indicates that, when operating in multi-band WNM sleep mode, the non-AP STA can check the TIM/DTIM only on the band indicated in the request frame.

Figure 11B:
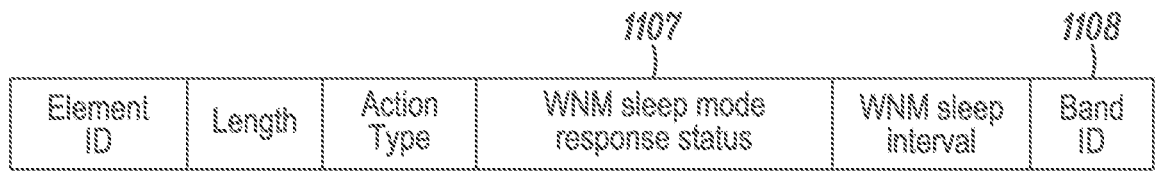

In order to enable negotiation with the AP, the response frame may be augmented by adding a new WNM sleep mode response status field 1107 as shown in FIG. 11B. For example, the response frame may be modified to indicate that the request is denied and to identify another band in which the STA is to wake up and check for TIM/DTIM elements. The other band may be indicated using the Band ID field 1108.

Multi-band WNM sleep mode can coexist with the multi-band PS mode. As described above, the multi-band PS mode is an adaptation of the legacy power save protocol (PSP) to multi-band operation, in order to control the transitions of the non-AP STA among active states, doze states, and deep sleep states on the different bands (e.g. secondary or active mode band and primary or power save mode band). The multi-band PS mode defines on which bands TIM and DTIM are sent, on which bands PS-Polls or null frames with power save management on/off are sent, and on which bands buffered packets are sent when the STA transitions to the active state. The multi-band PS mode also defines rules to transition among the different power save states in each of the bands and the negotiation of the different parameters that govern the multi-band PSP mode of operation.

In one example, a non-AP STA has negotiated a multi-band PS mode with its AP such that the STA receives TIM and DTIM only on the primary band, and that buffered data are transmitted/received only on the secondary band. In this example, it is as if the multi-band WNM sleep mode parameters are not defined if the parameters are the same as for the PS mode (e.g. specifying that the TIM and DTIM are on the same band as for the PS mode).

In such a case, it is possible to use only WNM sleep mode frames, instead of multi-band WNM sleep modes frames. If such frames are sent while the STA is in multi-band PS mode, the WNM sleep mode is considered a multi-band WNM sleep mode and the parameters are the same for multi-band WNM sleep mode as for the multi-band PS mode (e.g. TIM/DTIM are specified as being on the primary band).

Another example concerns WMM APSD mode. WMM APSD, which stands for Wi-Fi Multimedia (WMM) Automatic Power Save Delivery, is defined for the current IEEE 802.11 standards. This mode allows the STAs to conserve their batteries while connected to Wi-Fi network by allowing STAs to enter standby or sleep mode for extended intervals without being disassociated from the AP.

APSD is a mechanism for the delivery of downlink buffered packets to power-saving STAs. The frames transmitted by a STA in PS mode using APSD have the Power Management subfield in their Frame Control field set to 1 to cause buffering to take place at the AP.

There are two types of APSD that may be used to implement this type of battery power saving feature, unscheduled automatic power save delivery (U-APSD) and scheduled automatic power save delivery (S-APSD).

In U-APSD, also known as WMM Power Save, STAs signal the AP to transmit any buffered data. An unscheduled service period (SP) begins when the AP receives a trigger frame from a STA. The unscheduled SP ends after the AP has attempted to transmit at least one buffer unit (BU) destined for the STA using a delivery-enabled access category (AC). The number of BUs sent during an SP, is limited by the length of the SP, which is indicated in a Max SP Length field of the QoS Capability element of the STA's (Re) Association Request frame, when the Max SP Length field has a nonzero value. By setting the end of service period (EOSP) field to 1 in the last frame sent during an SP, an unscheduled SP may be terminated before the maximum number of BUs in the SP have been sent.

In S-APSD the AP sends the buffered data based on a predetermined schedule known to the power-saving device without any trigger signal from the STA. Scheduled SPs start at fixed intervals specified in the Service Interval (SI) field. A scheduled SP begins at the scheduled awake up time that corresponds to the SI and the service start time indicated in the Schedule Element sent in response to a traffic specification (TSPEC) or group cast with retries (GCR) Request.

The examples described below adapt the APSD power management scheme to a multi-band framework. The behavior of the scheme linked to the TIM and DTIM in beacons is also adapted. In one example, a STA and an AP can communicate over multiple bands (example, one a primary, power save mode band, or control channel band, and a secondary, active mode band, or data channel band).

At a high level, the example adapts the legacy APSD protocol to support multi-band operation, in order to control the transitions between the active state, doze states, and deep sleep states of the STA on and from the different bands. To achieve this, the example defines at least one primary APSD band, on which a multi-band TIM and DTIM element are sent, this element also indicates the band on which the STA sends operating bands trigger frames. Alternatively, the primary band may be the band on which the AP sends legacy TIM and DTIM. In this example, the band on which the buffered packets are to be delivered is pre-negotiated with every STA.

The multi-band set up which supports APSD also establishes a multi band common buffering operation. This operation indicates on which bands buffered packets will be sent when the STA transitions from a sleep state to the active state. In addition to defining these parameters of multi-band APSD, this example specifies rules for transitioning among different power save states in each of the bands.

The examples described below improve multi-band operation by implementing a multi-band APSD power save operation mode in which a non-AP STA receives a single TIM and/or DTIM in a different band. It also supports common buffering operation indicating the band(s) on which the buffered data will be received.

In a first example, an AP and STA have established and negotiated a multi-band link aggregation session, or a multi-band power save session, as described above. The legacy APSD is extended to the multi-band APSD by defining primary and secondary bands/channels for the APSD, a multi-band common buffering methodology, rules for transitioning among the different multi-band APSD's power save states in each of the bands/channels, and a multi-band APSD negotiation protocol.

In one example, the APSD primary band may be designated as an APSD control channel band and/or as the band considered as being used in APSD power save when no data are exchanged. Other channels may be designated as APSD secondary band(s), (i.e. the bands/channels used as data channel bands, and/or as the bands considered as being used in active mode when data are exchanged). It is noted that using data link aggregation, both primary and secondary bands/channels may actually include multiple frequency bands that are aggregated.

In this example, QoS APs signal their multi-band APSD capability using a new multi-band APSD subfield in the Capability Information field of the beacon, Probe Response, and/or (Re) Association Response frames. The QoS STAs use the Power Management subfield in the Frame Control field of a frame to indicate whether the QoS STAs are in an active mode or a PS mode. As multi-band APSD is a mechanism for the delivery of downlink BUs to power-saving STAs, the frames transmitted by a STA in PS mode that is using APSD have the Power Management subfield in the Frame Control field set to 1, thereby causing buffering to take place at the AP, as described above.

Similar to the legacy APSD, the multi-band APSD protocol defines two delivery mechanisms, namely multi-band unscheduled APSD (MBU-APSD) and multi-band scheduled APSD (MBS-APSD). STAs may use MBU-APSD to have some or all of their BUs delivered during unscheduled SPs and STAs may use MBS-APSD to schedule delivery of some or all of their BUs during scheduled SPs.

Figure 12:
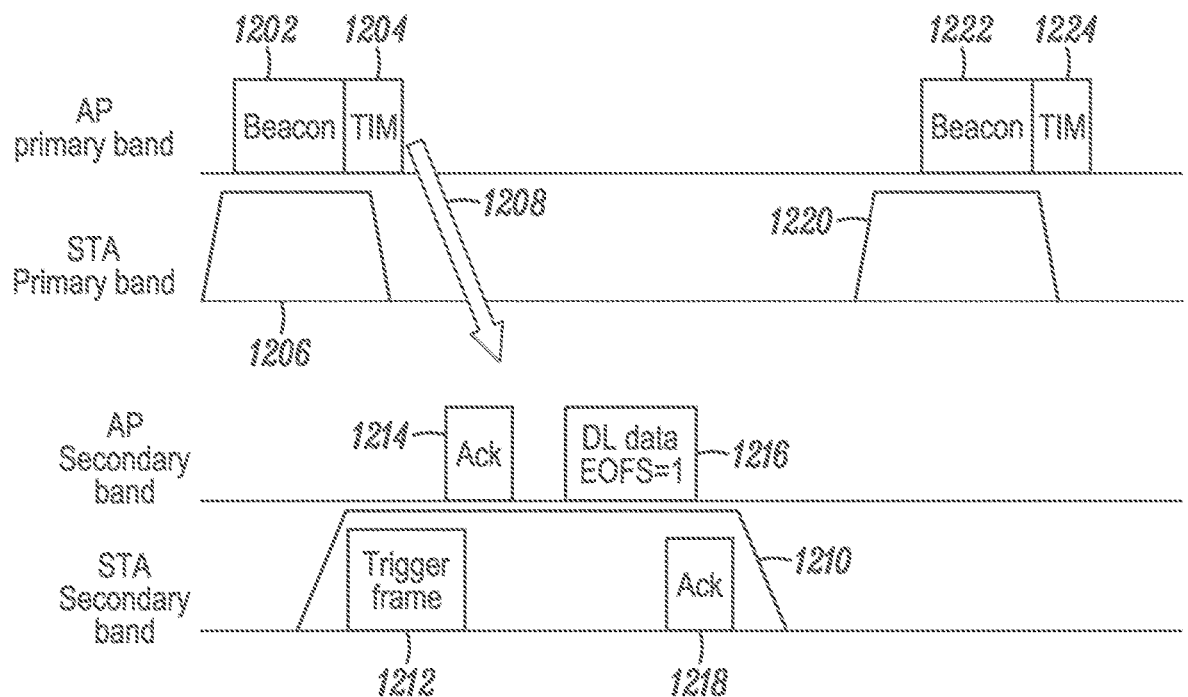
FIGS. 12 and 13 are timing diagrams that are useful for describing an automatic power save delivery (APSD) mechanism for use in a multi-carrier link aggregation system.

The MBU-APSD protocol operates as shown in FIG. 12. At 1206, the primary band of the STA wakes up from a doze or sleep state and receives the beacon 1202 and TIM 1204 indicating that the AP has data to send to the STA, as shown by the arrow 1208. When there are no unscheduled multi-band APSD SPs in progress, the secondary band of the STA wakes up from the doze or sleep state, at 1210, and sends a multi-band APSD trigger frame to the AP. The trigger frame may be a QoS Data frame or a QoS Null frame using an AC the STA that has been configured to be trigger-enabled. An aggregation MAC protocol data unit MPDU (A-MPDU) that contains one or more APSD trigger frames may act as a multi-band APSD trigger frame. The AP acknowledges receipt of the MBU APSD trigger frame at 1214. The AP, at 1216, then sends a BU on its secondary band to the secondary band of the STA which the STA acknowledges at 1218. As described above, the MBU APSD SP ends after the AP has attempted to transmit at least one BU using a delivery-enabled AC and destined for the STA. The number of BUs received during an SP is limited by the Max SP Length field of the QoS Capability element of the STA's (Re) Association Request frame if the field has a nonzero value. The MBU APSD may also be ended by setting the EOSP field to 1 in the last frame sent during the SP.

As described above, one adaptation of legacy APSD multi-frame operation is to allow multi-band APSD trigger frames to be sent on any bands/channels supported by the pre-negotiated multi-band operation. Such multi-band APSD trigger frames trigger the delivery of the BUs on the same band on which the multi-band APSD trigger frames have been sent.

Alternatively, the multi-band APSD trigger frames can be sent on any bands supported by the pre-negotiated multi-band operation. These multi-band APSD frames, however, trigger the delivery of the BUs on the band indicated in the trigger frame, or in the band that has been identified in the setup phase of the MBU APSD operation.

Figure 13:
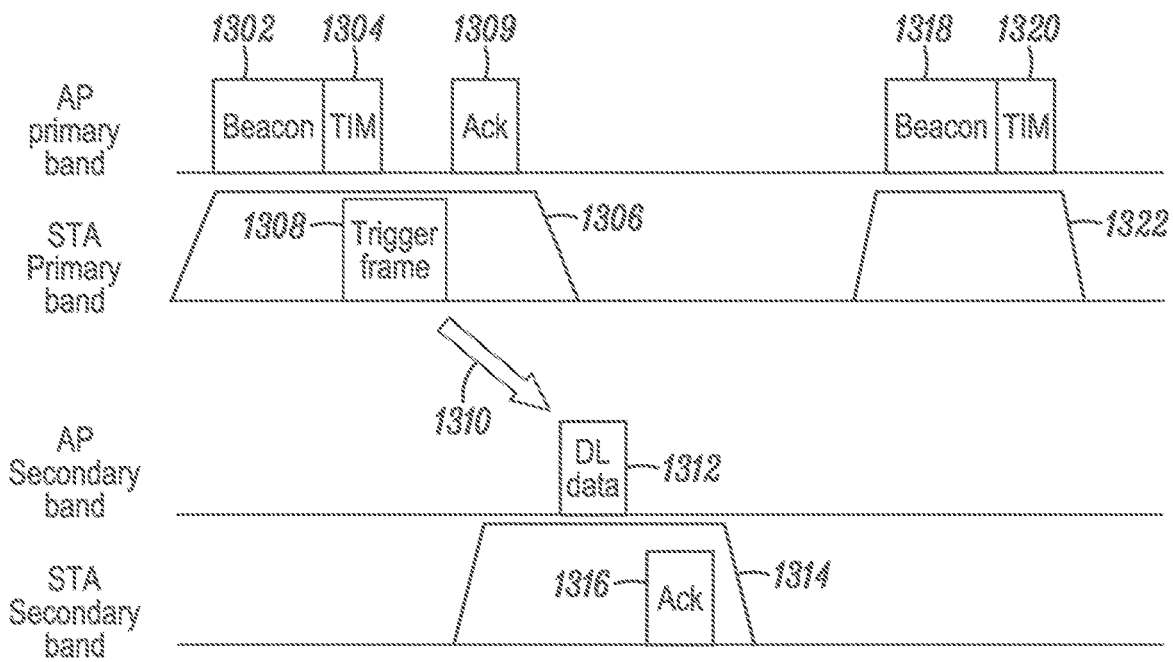

FIG. 13 shows an example in which the multi-band APSD TIM is transmitted in the primary band and the multi-band APSD trigger frames are sent in the primary band. The APSD trigger frames include information indicating that the secondary band of the STA will be in active mode for a pre-negotiated interval after the multi-band APSD trigger. The BUs can then, by using the Band ID field 1108, be delivered by the AP on the secondary band.

At 1306, the primary band of the STA transitions from a doze or sleep state to an awake state in time to receive the beacon 1302 and TIM 1304 from the AP. At 1308 the STA receives the TIM and determines that the AP has buffered data to be delivered. The STA, at 1308, sends a trigger frame in its primary band which is received and acknowledged by the AP at 1309. As indicated by the arrow 1310, the trigger frame from the STA causes the AP to send the buffered data, at 1312, to the STA. After sending the trigger frame, at 1314, the STA also transitions it secondary band from doze or sleep state to awake state. At 1316, the STA receives and acknowledges the buffered data on its secondary band. Both the STA and AP then transition their secondary bands to doze or sleep state until the next trigger frame. The primary band of the STA also transitions to sleep state until the next Beacon interval 1322 in which the beacon 1318 and TIM 1320 are sent.

The configuration of the AP for MBU APSD operation may occur as follows. First, the STA may designate one or more of its ACs as being trigger-enabled and one or more of its ACs as being delivery enabled. Using these designations, the STA selects a band on which it wants the multi-band APSD TIM and DTIM elements to be sent and selects a band on which it wants the buffered data to be delivered. This configuration can be accomplished using new multi-band APSD request/response frames. These negotiations can occur during normal operations with exchanges of request and response frames including Deny, Accept or Accept Assuming Parameters Changes messages, until the AP and STA agree on the parameters.

In another mode of operation, this negotiation can be done as part of the multi-band link aggregation setup procedure, by modifying the multi-band link aggregation request/response frames to include the support for MBU APSD or MBS APSD to negotiate the different parameters. This option allows the multi-band APSD power save setup to be combined with the for multi-band link aggregation setup.

At the end of this APSD power save negotiation, it should be known on which band(s) the multi-band APSD TIM and DTIM is to be delivered, including if there is one multi-band APSD TIM/DTIM for all bands, or if there is a separate multi-band APSD TIM/DTIM for each band. It should also be known on which band(s) the data packets can be delivered by the AP and on which band(s) the multi-band APSD trigger frames can be sent. Furthermore the configuration defines which ACs are multi-band APSD trigger enabled and which are delivery enabled. Finally, the negotiation establishes which of the STA band(s) are active during the MBU APSD SP and the state on each band when no MBU APSD operation is in progress (e.g. a doze or sleep state on all bands).

Similar changes are proposed to adapt legacy scheduled APSD to MBS APSD. During the pre-negotiation, all the information defined above for the MBU APSD case are exchanged and defined for the MBS APSD. In addition, the setup procedure defines the fixed interval at which the scheduled multi-band APSD SP starts. This information may be conveyed in a new multi-band APSD Service Interval field.

The examples described above may be implemented without changing the trigger frames. A trigger frame in the APSD context (which is just a QoS data or QoS null frame) is different than the trigger frame in the IEEE 802.11ax standard that triggers uplink multiuser (UL MU) operation. In some mode of operation, however, the trigger frames can include an indication of the band ID of the band on which the buffered data is to be delivered. This can be achieved, for example, by including the band ID in a specific multi-band APSD variant of the HE control field that is included in the MAC header of HE frames.

As described above, in some of the examples the multi-band APSD request and response frames include different fields that are defined during the pre-negotiation. Alternatively, this information can be exchanged as part of the multi-band link aggregation setup procedure, by modifying the multi-band link aggregation request/response frames to include the support for MBU APSD or MBS APSD in which case, the different parameters that can be negotiated.

EXAMPLES

Example 1 may include an apparatus for implementing power control in a device that operates in multiple bands, the apparatus comprising: an interface to multiple radio transceivers, the multiple radio transceivers operating in different bands of the multiple bands; and a processor, coupled to the interface and configured to set-up a power control protocol for use in multi-band communications between the device and a peer device, the processor being configured to; generate a request to use one of the multiple bands to signal power control operations, and to use another one of the multiple bands to transfer data between the device and the peer device during the multi-band communications; encode the request to use the one band and the other band; decode a response to the request; and identify a control channel band and a data channel band in the multiple bands based on the response to the request.

Example 2 may include the apparatus of example 1 or any other example, wherein one of the bands is an aggregated multi-band channel.

Example 3 may include the apparatus of example 1 or any other example, wherein the processor is further configured to: monitor data received from the interface via the control channel band; and responsive to the data received via the control channel band, activate at least one of the radio transceivers corresponding to the data channel band.

Example 4 may include the apparatus of example 1 or any other example, wherein the device includes a Wi-Fi transceiver and the multiple bands include a 2.4 GHz band and a 5 GHz band.

Example 5 may include the apparatus of example 4 or any other example, wherein the multiple bands further include a 60 GHz band.

Example 6 may include the apparatus of example 1 or any other example, wherein the processor is further configured to: assign the control channel band and the data channel band to a first power save mode having a first power save mode identifier; generate a further request to use a first further band in one of the multiple bands to signal power control operations, and to use a second further band in one of the multiple bands to transfer data between the device and the peer device during the multi-band communications; encode the request to use the first and second further bands; decode a response to the request; and assign, based on the response to the further request, a further control channel band a further data channel band of the multiple bands to a second power save mode having a second power save mode identifier.

Example 7 may include the apparatus of example 6 or any other example, wherein the processor is further configured to: encode a request including conditions for switching between the first and second power save modes; decode a response to the request; and determine, based on the response to the request, conditions for switching between the first and second power save modes.

Example 8 may include the apparatus of example 6 or any other example, wherein: the device is a Wi-Fi station (STA) and the peer device is a Wi-Fi access point (AP); the control channel band and the further control channel band respectively identify respective ones of the multiple bands from which the processor is configured to decode one or more of a traffic indicator map (TIM) or a delivery traffic indicator map (DTIM), or on which the processor is configured to encode a power save polling frame, or a Null frame having a power management bit according to the respective first and second power save modes; and the data channel band and the further data channel band respectively identify respective ones of the multiple bands on which the processor is configured to decode downlink data packets according to the respective first and second power save modes.

Example 9 may include the apparatus of example 1 or any other example, wherein: the device is a Wi-Fi station (STA) and the peer device is a Wi-Fi access point; the data channel band includes the band of the multiple bands from which the processor is configured to decode one or more of a traffic indicator map (TIM), a delivery traffic indicator map (DTIM) from on which, the processor is configured to encode a power save (PS) polling frame, or a Null frame having a power management bit, and the data channel band includes the band of the multiple bands from which the processor is configured to decode downlink data packets.

Example 10 may include the apparatus of example 1 or any other example, wherein the control channel band includes a band of the multiple bands from which the processor is configured to decode a delivery traffic indicator map (DTIM) and the data channel band includes a band of the multiple bands from which the processor is configured to decode broadcast/multicast packets.

Example 11 may include the apparatus of example 1 or any other example, wherein the device is a station (STA), the peer device is an access point (AP) and the control channel band includes a band of the multiple bands on which the processor is configured to encode a wireless network management (WNM) sleep mode request, the WNM sleep mode request including an indication that the STA supports WNM sleep mode and a request for an idle period.

Example 12 may include the apparatus of example 11 or any other example, wherein the control channel band includes a plurality of bands of the multiple bands on which the processor is configured to encode respectively different WNM sleep mode requests.

Example 13 may include the apparatus of example 11 or any other example, wherein the control channel band includes a band of the multiple bands on which the processor is configured to encode a PS polling frame.

Example 14 may include the apparatus of example 1 or any other example, wherein the control channel band includes at least one band of the multiple bands from which the processor is configured to decode automatic power save delivery (APSD) traffic indicator maps (TIMs) or APSD delivery traffic indicator maps (DTIMs) and at least one band on which the processor is configured to encode multi-band unscheduled APSD trigger frames and the data channel band includes at least one band of the multiple bands from which the processor is configured to decode downlink data.

Example 15 may include the apparatus of example 1 or any other example, wherein the control channel band includes at least one band of the multiple bands from which the processor is configured to decode multi-band scheduled automatic power save delivery (APSD) traffic indicator maps (TIMs) or APSD delivery traffic indicator maps (DTIMs) and the data channel band includes at least one band of the multiple bands from which the processor is configured to decode downlink data.

Example 16 may include a power control method for a device that includes multiple radio transceivers operating in multiple bands, the method comprising: generating a request to use one of the multiple bands to signal power control operations for the device, and to use another one of the multiple bands to transfer data between the device and the peer device; encoding the request to use the one band and the other band; decoding a response to the request; identifying a control channel band and a data channel band in the multiple bands based on the response to the request; receiving an indication on the control channel that data is available for the device; and transitioning the data channel from a sleep state to and active state.

Example 17 may include the method of example 16 or any other example, wherein generating the request to use one of the multiple bands to transfer data between the device and the peer device includes generating a request to use an aggregated multi-band channel as the data channel band.

Example 18 may include the method of example 16 or any other example, further comprising: monitoring data received via the control channel band; and responsive to the data received via the control channel band, activate at least one radio transceivers corresponding to the data channel band.

Example 19 may include the method of example 16 or any other example, wherein the device is a Wi-Fi station (STA) and the peer device is a Wi-Fi access point (AP) and the method further comprises decoding one of a traffic indicator map (TIM) or a delivery traffic indicator map (DTIM) from the control channel band.

Example 20 may include the method of example 16 or any other example, wherein the device is a station (STA), the peer device is an access point (AP) and the method further comprises encoding, for transmission to the AP on the control channel band, a wireless network management (WNM) sleep mode request, the WNM sleep mode request including an indication that the STA supports WNM sleep mode and a request for an idle period.

Example 21 may include the method of example 16 or any other example, wherein the device is a station (STA), the peer device is an access point (AP) and the method further comprises encoding multi-band unscheduled APSD trigger frames for transmission to the AP on the control channel band.

Example 22 may include a non-transitory computer readable medium including program instructions that, when executed, are configured to cause a processor of a device that includes multiple radio transceivers operating in multiple bands to: generate a request to use one of the multiple bands to signal power control operations for the device, and to use another one of the multiple bands to transfer data between the device and the peer device; encode the request to use the one band and the other band; decode a response to the request; and identify a control channel band and a data channel band in the multiple bands based on the response to the request.

Example 23 may include the non-transitory computer-readable medium of example 22 or any other example, wherein the instructions are configured cause the processor to generate the request to use one of the multiple bands to transfer data between the device and the peer device includes instructions that cause the processor to generate a request to use an aggregated multi-band channel as the data channel band.

Example 24 may include the non-transitory computer-readable medium of example 22 or any other example, wherein the device is a station (STA), the peer device is an access point (AP) and the program instructions are further configured to cause the processor to encode a wireless network management (WNM) sleep mode request, the WNM sleep mode request including an indication that the STA supports WNM sleep mode and a request for an idle period for transmission to the AP on the control channel.

Example 25 may include the non-transitory computer-readable medium of example 22 or any other example wherein, the device is a station (STA), the peer device is an access point (AP) and the program instructions are further configured to cause the processor to encode multi-band unscheduled APSD trigger frames for transmission to the AP on the control channel.

Example 26 may include an apparatus for implementing power control in a device that operates in multiple bands, the apparatus comprising: means for transmitting and receiving signals in multiple bands; and means for setting-up a power control protocol for use in multi-band communications between the device and a peer device, including means for generating a request to use one of the multiple bands to signal power control operations, and to use another one of the multiple bands to transfer data between the device and the peer device during the multi-band communications; means for encoding the request to use the one band and the other band; means for decoding a response to the request; means for identifying a control channel band and a data channel band in the multiple bands based on the response to the request.

Example 27 may include the apparatus of example 26 or any other example, wherein one of the bands is an aggregated multi-band channel.

Example 28 may include the apparatus of example 26 or any other example, further comprising: means for monitoring data received from the interface via the control channel band; and means for activating at least one of the radio transceivers corresponding to the data channel band responsive to the data received via the control channel band.

Example 29 may include the apparatus of example 26 or any other example, wherein the device includes means for transmitting and receiving Wi-Fi signals in a 2.4 GHz band and a 5 GHz band.

Example 30 may include the apparatus of example 29 or any other example, further comprising means for transmitting and receiving Wi-Fi signals in a 60 GHz band.

Example 31 may include the apparatus of example 26 or any other example, further comprising means for assigning the control channel band and the data channel band to a first power save mode having a first power save mode identifier; means for generating a further request to use a first further band in one of the multiple bands to signal power control operations, and to use a second further band in one of the multiple bands to transfer data between the device and the peer device during the multi-band communications; means for encoding the request to use the first and second further bands; means for decoding a response to the request; and means for assigning, based on the response to the further request, a further control channel band a further data channel band of the multiple bands to a second power save mode having a second power save mode identifier.

Example 32 may include the apparatus of example 31 or any other example, further comprising means for encoding a request including conditions for switching between the first and second power save modes; means for decoding a response to the request; and means for determining, based on the response to the request, conditions for switching between the first and second power save modes.

Example 33 may include the apparatus of example 31 or any other example, wherein: the device includes means for receiving Wi-Fi signals from and for transmitting Wi-Fi signals to a Wi-Fi access point (AP); and the device further includes means for decoding, from the control channel band or the further control channel band respectively, one or more of a traffic indicator map (TIM) or a delivery traffic indicator map (DTIM), or means for encoding, for transmission on the control channel band or the further control channel band, a power save polling frame, or a Null frame having a power management bit according to the respective first and second power save modes; and means for decoding downlink data packets from the data channel band or the further data channel band according to the respective first and second power save modes.

Example 34 may include the apparatus of example 26 or any other example, wherein: the device includes means for receiving Wi-Fi signals from and for transmitting Wi-Fi signals to a Wi-Fi access point; the device further includes means for decoding, from the control channel band, one or more of a traffic indicator map (TIM), a delivery traffic indicator map (DTIM) from on which or means for encoding on the control channel band, a power save (PS) polling frame, or a Null frame having a power management bit; and means for decoding downlink data packets from the data channel band.

Example 35 may include the apparatus of example 26 or any other example, wherein the device includes means for decoding, from the control channel band, a delivery traffic indicator map (DTIM) and means for decoding broadcast/multicast packets from the data channel band.

Example 36 may include the apparatus of example 26 or any other example, wherein the device includes means for receiving Wi-Fi signals from and for transmitting Wi-Fi signals to a Wi-Fi access point and means for encoding, for transmission on the control channel band, a wireless network management (WNM) sleep mode request, the WNM sleep mode request including an indication that the STA supports WNM sleep mode and a request for an idle period.

Example 37 may include the apparatus of example 36 or any other example, wherein the control channel band includes a plurality of bands of the multiple bands and the device includes means for encoding respectively different WNM sleep mode requests for transmissions on the plurality of bands.

Example 38 may include the apparatus of example 36 or any other example, wherein the control channel band includes a band of the multiple bands and the device includes means for encoding a PS polling frame for transmission on the control channel band.

Example 39 may include the apparatus of example 26 or any other example, further comprising: means for decoding automatic power save delivery (APSD) traffic indicator maps (TIMs) or APSD delivery traffic indicator maps (DTIMs) from the control channel band; means for encoding multi-band unscheduled APSD trigger frames for transmission on the control channel band; and means for decoding downlink data from the data channel band at a predetermined interval after the transmission of the APST trigger frames.

Example 40 may include the apparatus of example 26 or any other example, further comprising: means for decoding, from the control channel band, multi-band scheduled automatic power save delivery (APSD) traffic indicator maps (TIMs) or APSD delivery traffic indicator maps (DTIMs); and means for decoding, downlink data from and the data channel band at times indicated by the APSD TIMs or APSD DTIMs.

The invention claimed is:

1. An apparatus of a non-access point (AP) station (STA) configured to operate as a first affiliated STA (STA1) of a non-AP multi-link device comprising a plurality of affiliated STAs including the first affiliated station (STA1), a second affiliated station (STA2) and a third affiliated station (STA3), the apparatus comprising: processing circuitry; and memory,
wherein the processing circuitry is configured to:
perform a multi-link setup procedure for multi-link operation with an AP multi-link device comprising a plurality of affiliated APs including a first affiliated AP (AP1), a second affiliated AP (AP2) and a third affiliated AP (AP3), the multi-link setup procedure performed to set up a link between each of the affiliated STAs and a corresponding one of the affiliated APs of the AP multi-link device, the multi-link setup procedure comprising an exchange of an association request frame and an association response frame on a first of the links to set up each of the links including the first link between the first affiliated STA and the first affiliated AP, a second link between the second affiliated STA and the second affiliated AP, and a third link between the third affiliated STA and the third affiliated AP;
wherein each of the links are set up within one of a plurality of bands including a 2.4 GHz band and a 5 GHz band, and
for the first of the links that is enabled for the first affiliated STA for multi-link operation after a successful multi-link setup with the exchange of association request and response frames on the first link, an initial power management mode of the first affiliated STA is set to active mode; and
for the second and the third of the links that are enabled, respectively, for the second and third affiliated STAs for multi-link operation after the successful multi-link setup with the exchange of association request and response frames on the first link, the initial power management mode of the second and third affiliated STAs is set to a power save mode; and
retrieve buffered data from the AP multi-link device over the first link that is enabled for the first affiliated STA (STA1) when the first affiliated STA (STA1) is in the active mode.

2. The apparatus of claim 1, wherein the processing circuitry is to encode the association request frame to indicate the links that are requested for setup and to include information of each of the affiliated STAs.

3. The apparatus of claim 2, wherein the processing circuitry is configured to retrieve buffered data for the second of the affiliated stations (STA2) from the AP multi-link device over the first link that is enabled for the first affiliated STA (STA1) when the first affiliated STA (STA1) is in the active mode.

4. The apparatus of claim 1, wherein the memory is configured to store the association request frame.

5. The apparatus of claim 4, wherein the processing circuitry comprises a baseband processor.

6. An apparatus of a non-access point (AP) station (STA) configured to operate as a first affiliated STA (STA1) of a non-AP multi-link device comprising a plurality of affiliated STAs, the apparatus comprising: processing circuitry; and memory,
wherein the processing circuitry is configured to:
perform a multi-link setup procedure with an AP multi-link device to set up links for the plurality of affiliated STAs for multi-link operation, the multi-link setup procedure comprising an exchange of association request and response frames;
wherein each of the links are set up within one of a plurality of bands including a 2.4 GHz band and a 5 GHz band, and
for a link that is enabled for an affiliated STA for multi-link operation after a successful multi-link setup with the exchange of association request and response frames on the link, an initial power management mode of the affiliated STA is set to active mode; and
for a link that is enabled for an affiliated STA for multi-link operation after a successful for a link that is enabled for an affiliated STA for multi-link operation after a successful multi-link setup with the exchange of association request and response frames on another link, the initial power management mode of the affiliated STA is set to a power save mode; and
retrieve buffered data from the AP multi-link device over a first link that is enabled for the first affiliated STA (STA1) when the first affiliated STA (STA1) is in the active mode;
retrieve buffered data for a second of the affiliated stations (STA2) from the AP multi-link device over the first link that is enabled for the first affiliated STA (STA1) when the first affiliated STA (STA1) is in the active mode,
wherein processing circuitry is configured to encode the association request frame to indicate the links that are requested for setup and to include information of each of the affiliated STAS,
wherein the processing circuitry is to:
transition the non-AP multi-link device from operating on the first link with the first affiliated STA (STA1) to operating on a second of the enabled links with the second affiliated STA (STA2); and
for operating on the second of the enabled links with the STA2, transition the second affiliated STA (STA2) to an active mode and transition the first affiliated STA (STA1) to a power save mode doze state.

7. The apparatus of claim 6, wherein the processing circuitry is configured map traffic identifiers for the affiliated STAs to all of the links that are set up to allow buffered data to be retrieved from the AP multi-link device for the affiliated STAs over any of the enabled links.

8. The apparatus of claim 7, wherein as part of the multi-link setup procedure, the processing circuitry is to encode the association request frame to include a multi-link element that includes the information of each of the affiliated STAs.

9. The apparatus of claim 8, wherein as part of the multi-link setup procedure, the processing circuitry is configured to decode an association response frame received from the AP multi-link device that includes a multi-link element that includes information of each of a plurality of access points affiliated with the AP multi-link device.

10. A non-transitory computer-readable storage medium that stores instructions for execution by processing circuitry a non-access point (AP) station (STA) configured to operate as a first affiliated STA (STA1) of a non-AP multi-link device comprising a plurality of affiliated STAs, wherein the processing circuitry is configured to:
  wherein the processing circuitry is configured to:
  perform a multi-link setup procedure for multi-link operation with an AP multi-link device comprising a plurality of affiliated APs including a first affiliated AP (AP1), a second affiliated AP (AP2) and a third affiliated AP (AP3), the multi-link setup procedure performed to set up a link between each of the affiliated STAs and a corresponding one of the affiliated APs of the AP multi-link device, the multi-link setup procedure comprising an exchange of an association request frame and an association response frame on a first of the links to set up each of the links including the first link between the first affiliated STA and the first affiliated AP, a second link between the second affiliated STA and the second affiliated AP, and a third link between the third affiliated STA and the third affiliated AP;
  wherein each of the links are set up within one of a plurality of bands including a 2.4 GHz band and a 5 GHz band, and
  for the first of the links that is enabled for the first affiliated STA for multi-link operation after a successful multi-link setup with the exchange of association request and response frames on the first link, an initial power management mode of the first affiliated STA is set to active mode; and
  for the second and the third of the links that are enabled, respectively, for the second and third affiliated STAs for multi-link operation after the successful multi-link setup with the exchange of association request and response frames on the first link, the initial power management mode of the second and third affiliated STAs is set to a power save mode; and
  retrieve buffered data from the AP multi-link device over the first link that is enabled for the first affiliated STA (STA1) when the first affiliated STA (STA1) is in the active mode.

11. The non-transitory computer-readable storage medium of claim 10, wherein the processing circuitry is to encode the association request frame to indicate the links that are requested for setup and to include information of each of the affiliated STAs.

12. The non-transitory computer-readable storage medium of claim 11, wherein the processing circuitry is configured to retrieve buffered data for the second of the affiliated stations (STA2) from the AP multi-link device over the first link that is enabled for the first affiliated STA (STA1) when the first affiliated STA (STA1) is in the active mode.

13. The non-transitory computer-readable storage medium of claim 12, wherein the processing circuitry is to:
  transition the non-AP multi-link device from operating on the first link with the first affiliated STA (STA1) to operating on the second of the enabled links with the second affiliated STA (STA2); and
  for operating on the second of the enabled links with the STA2, transition the second affiliated STA (STA2) to an active mode and transition the first affiliated STA (STA1) to a power save mode doze state.

14. The non-transitory computer-readable storage medium of claim 13, wherein the processing circuitry is configured map traffic identifiers for the affiliated STAs to all of the links that are set up to allow buffered data to be retrieved from the AP multi-link device for the affiliated STAs over any of the enabled links.

15. The non-transitory computer-readable storage medium of claim 14, wherein as part of the multi-link setup procedure, the processing circuitry is to encode the association request frame to include a multi-link element that includes the information of each of the affiliated STAs.

16. The non-transitory computer-readable storage medium of claim 15, wherein as part of the multi-link setup procedure, the processing circuitry is configured to decode an association response frame received from the AP multi-link device that includes a multi-link element that includes information of each of a plurality of access points affiliated with the AP multi-link device.

17. An apparatus of access point (AP) configured to operate as a first affiliated AP (AP1) of an AP multi-link device comprising a plurality of affiliated APs including the first affiliated AP (AP1), a second affiliated AP (AP2) and a third affiliated AP (AP3), the apparatus comprising: processing circuitry; and memory,
  wherein the processing circuitry is configured to:
  perform a multi-link setup procedure for multi-link operation with a non-AP multi-link device to set up links for a plurality of affiliated stations (STAs) including a first affiliated station (STA1), a second affiliated station (STA2) and a third affiliated station (STA3), the multi-link setup procedure performed to set up a link between each of the affiliated STAs and a corresponding one of the affiliated APs of the AP multi-link device, the multi-link setup procedure comprising an exchange of an association request frame and an association response frame on a first of the links to set up each of the links including the first link between the first affiliated STA and the first affiliated AP, a second link between the second affiliated STA and the second affiliated AP, and a third link between the third affiliated STA and the third affiliated AP;
  wherein each of the links are set up within one of a plurality of bands including a 2.4 GHz band and a 5 GHz band, and
  for the first of the links that is enabled for the first affiliated AP for multi-link operation after a successful multi-link setup with the exchange of association request and response frames on the first link, an initial power management mode of the affiliated AP is set to active mode; and
  for the second and the third of the links that are enabled, respectively, for the second and third affiliated STAs for multi-link operation after a successful multi-link setup with the exchange of association request and response frames on another link, the initial power management mode of the second and third affiliated APs is set to a power save mode; and
  transfer buffered data to the non-AP multi-link device over first link that is enabled for the first affiliated (AP1) when the first affiliated AP (AP11) is in the active mode.

18. The apparatus of claim 17, wherein the processing circuitry is to decode the association request frame received from the non-AP multi-link device, the associate request frame to indicate the links that are requested for setup and to include information of each of the affiliated STAs.

19. The apparatus of claim 18, wherein the processing circuitry is configured to transfer buffered data from the second of the affiliated APs (AP2) from the AP multi-link device over the first link that is enabled for the first affiliated AP (AP11) when the first affiliated AP (AP1) is in the active mode.

* * * * *